(12) United States Patent
Magee

(10) Patent No.: US 10,556,629 B2
(45) Date of Patent: Feb. 11, 2020

(54) INNER WHEEL SKIRT REDUCING VEHICLE DRAG

(71) Applicant: Garth L. Magee, Hawthorne, CA (US)

(72) Inventor: Garth L. Magee, Hawthorne, CA (US)

(*) Notice: Subject to any disclaimer, the term of this patent is extended or adjusted under 35 U.S.C. 154(b) by 170 days.

(21) Appl. No.: 15/830,236

(22) Filed: Dec. 4, 2017

(65) Prior Publication Data

US 2019/0168827 A1 Jun. 6, 2019

Related U.S. Application Data

(63) Continuation-in-part of application No. 15/815,628, filed on Nov. 16, 2017.

(51) Int. Cl.
- *B62D 35/00* (2006.01)
- *B62D 35/02* (2006.01)
- *B62D 25/16* (2006.01)

(52) U.S. Cl.
CPC ........... *B62D 35/02* (2013.01); *B62D 25/168* (2013.01); *B62D 35/001* (2013.01)

(58) Field of Classification Search
CPC .............................. B62D 35/001; B62D 35/02
USPC ............................................ 296/180.1, 180.4
See application file for complete search history.

(56) References Cited

U.S. PATENT DOCUMENTS

| | | | | |
|---|---|---|---|---|
| 6,685,256 B1* | 2/2004 | Shermer | ................. | B60J 5/108 296/180.1 |
| 6,786,291 B1* | 9/2004 | Linden | .................. | B62D 21/02 180/68.2 |
| 7,748,471 B2* | 7/2010 | Osadchuk | ................ | E21B 7/02 173/28 |
| 8,684,447 B2* | 4/2014 | Henderson | ........... | B62D 35/001 296/180.4 |
| 8,783,758 B2* | 7/2014 | Baker | ................. | B62D 35/001 296/180.4 |
| 9,688,320 B2* | 6/2017 | Courtney | ............. | B62D 35/001 |
| 10,081,397 B2* | 9/2018 | Bacon | .................. | B62D 35/001 |
| 10,259,510 B2* | 4/2019 | Logounov | ........... | B62D 35/001 |
| 2016/0059910 A1* | 3/2016 | Durand | ............... | B62D 35/001 296/180.4 |
| 2017/0240220 A1* | 8/2017 | Kron | .................... | B62D 35/001 |

* cited by examiner

*Primary Examiner* — Joshua T Kennedy

(57) ABSTRACT

An inner wheel skirt panel centrally located under the body of a vehicle reduces overall vehicle drag by inhibiting air from otherwise being displaced laterally inward by the passing wheels of the moving vehicle. Maintaining air to remain generally static while passing under the vehicle through the central open-space between the wheels increases the effective air pressure developed immediately behind the vehicle to reduce overall drag developed between the front and rear of the vehicle. See FIGS. 27-30.

24 Claims, 23 Drawing Sheets

-Reference Art-

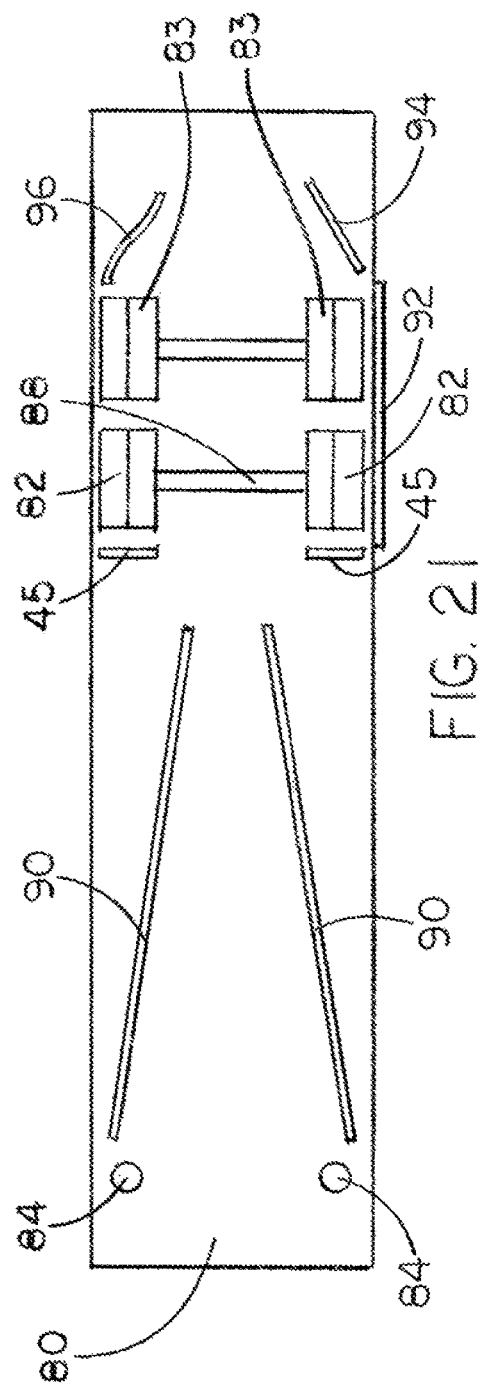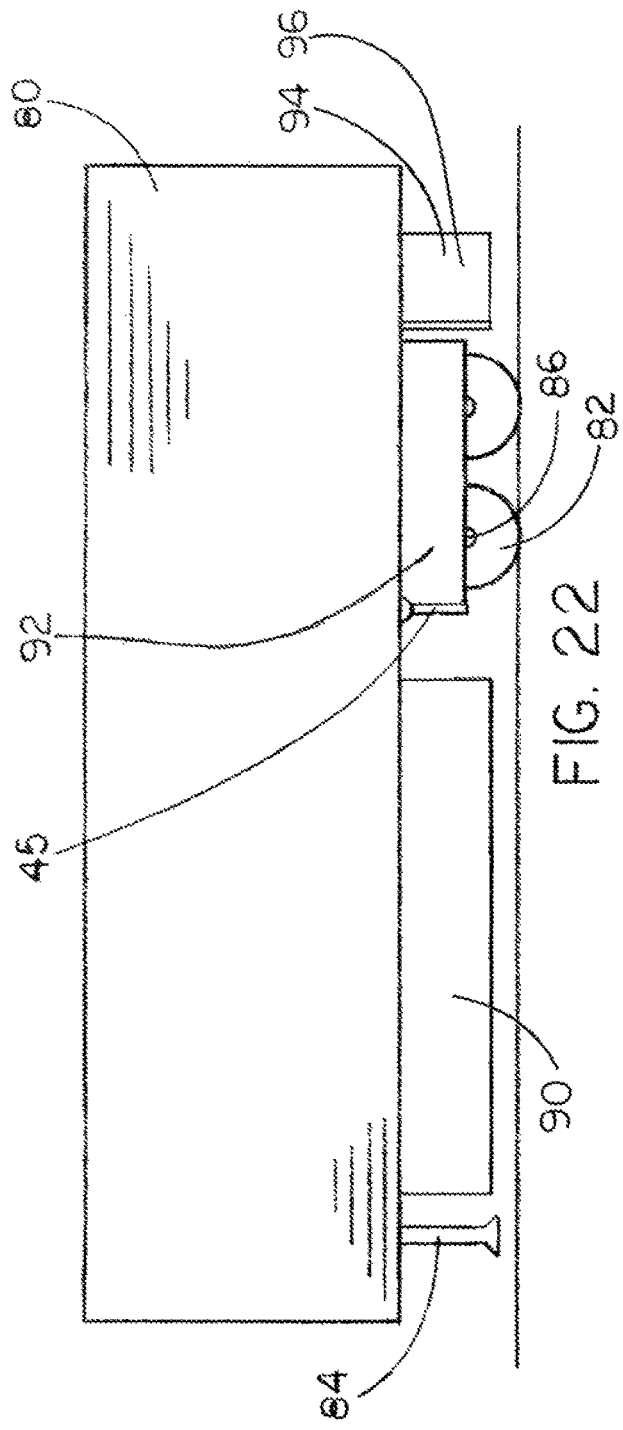
FIG. 21
FIG. 22

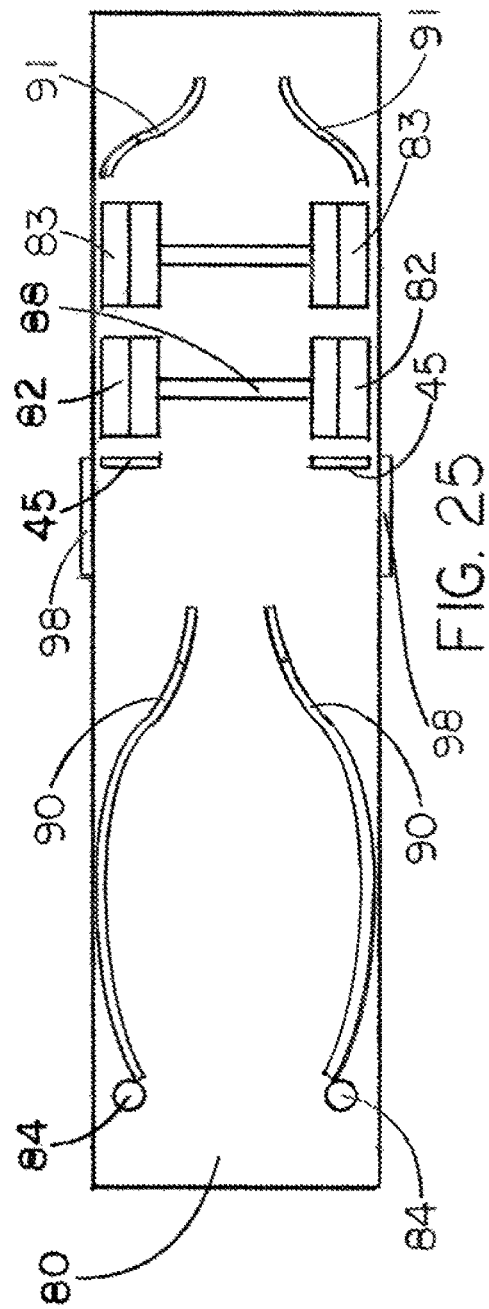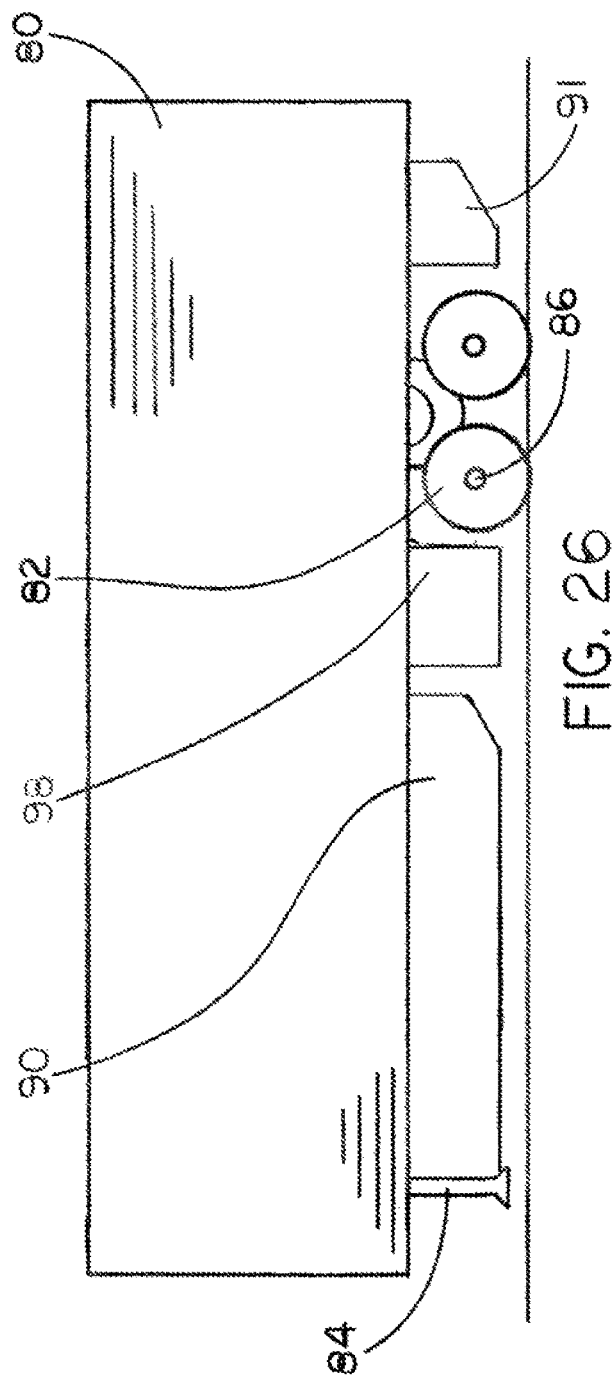

INNER WHEEL SKIRT REDUCING VEHICLE DRAG

CROSS-REFERENCE TO RELATED APPLICATION

This application is a continuation-in-part of patent application Ser. No. 15/815,628, filed Nov. 16, 2017 by Garth L. Magee.

BACKGROUND

Field

The present embodiment relates to an apparatus for the reduction of aerodynamic drag on vehicles having wind-exposed wheels of a wheel assembly mounted underneath the vehicle body, such as on large commercial trucks.

Description of Prior Art

Inherently characteristic of rotating vehicle wheels, and particularly of spoked wheels, aerodynamic resistance, or parasitic drag, is an unwanted source of energy loss in propelling a vehicle. Parasitic drag on a wheel includes viscous drag components of form (or pressure) drag and frictional drag. Form drag on a wheel generally arises from the circular profile of a wheel moving though air at the velocity of the vehicle. The displacement of air around a moving object creates a difference in pressure between the forward and trailing surfaces, resulting in a drag force that is highly dependent on the relative wind speed acting thereon. Streamlining the wheel surfaces can reduce the pressure differential, reducing form drag.

Frictional drag forces also depend on the speed of wind impinging exposed surfaces, and arise from the contact of air moving over surfaces. Both of these types of drag forces arise generally in proportion to the square of the relative wind speed, per the drag equation. Streamlined design profiles are generally employed to reduce both of these components of drag force.

The unique geometry of a wheel used on a vehicle includes motion both in translation and in rotation; the entire circular outline of the wheel translates at the vehicle speed, and the wheel rotates about the axle at a rate consistent with the vehicle speed. Form drag forces arising from the moving outline are apparent, as the translational motion of the wheel rim must displace air immediately in front of the wheel (and replace air immediately behind it). These form drag forces arising across the entire vertical profile of the wheel are therefore generally related to the velocity of the vehicle.

As the forward profile of a wheel facing the direction of vehicle motion is generally symmetric in shape, and as the circular outline of a wheel rim moves forward at the speed of the vehicle, these form drag forces are often considered uniformly distributed across the entire forward facing profile of a moving wheel (although streamlined cycle rims can affect this distribution somewhat). This uniform distribution of pressure force is generally considered centered on the forward vertical wheel profile, and thereby in direct opposition to the propulsive force applied at the axle, as illustrated in FIG. 17.

However, as will be shown, frictional drag forces are not uniformly distributed with elevation on the wheel, as they are not uniformly related to the speed of the moving outline of the wheel rim. Instead, frictional drag forces on the wheel surfaces are highly variable and depend on their elevation above the ground. Frictional drag must be considered separate from form drag forces, and can be more significant sources of overall drag on the wheel and, as will be shown, thereby on the vehicle.

Vehicles having wind-exposed wheels are particularly sensitive to external headwinds reducing propulsive efficiency. Drag force on exposed wheels increases more rapidly on upper wheel surfaces than on vehicle frame surfaces, causing a non-linear relation from rising wind speeds between net drag forces on vehicle frame surfaces versus net drag forces on vehicle wheel surfaces.

Since upper wheel surfaces are moving against the wind at more than the vehicle speed, the upper wheel drag forces contribute more and more of the total vehicle drag as external headwinds rise. Thus, as external headwinds rise, a greater fraction of the net vehicle drag is shifted from vehicle frame surfaces to upper wheel surfaces.

Moreover, upper wheel drag forces must be overcome by a propulsive counterforce applied at the axle. Such propulsive counterforces suffer a mechanical disadvantage against the upper wheel drag forces, since each net force is applied about the same pivot point located at the bottom where the wheel is in stationary contact with the ground. This mechanical advantage that upper wheel drag forces have over propulsive counterforces further augments the effective vehicle drag that exposed upper wheels contribute under rising headwinds. As a result of these magnified effects of upper wheel drag on resisting vehicle propulsion, vehicle drag is more effectively reduced by reducing the aerodynamic pressure on the upper wheel surfaces while leaving the lower wheel surfaces exposed to impinging headwinds.

Furthermore, shielding the lower wheel surfaces can cause a net increase in vehicle drag, and a loss in propulsive efficiency. Not only does the propulsive counterforce applied at the axle have a mechanical advantage over the lower wheel drag forces, but shielding the lower wheel surfaces using a deflector attached to the vehicle body shifts the drag force from being applied at the lower wheel to an effective higher elevation at the axle, thereby negating any mechanical advantage of a propulsive counterforce applied at the axle has over the lower wheel drag force. As a result, aerodynamic trailer skirts in widespread use today are unnecessarily inefficient, since they generally extend below the level of the axle.

Nevertheless, extended height trailer skirts have been shown to improve propulsive efficiency, since they reduce the aerodynamic pressure on the upper wheel surfaces, which cause the vast majority of wheel drag and virtually all of the loss in vehicle propulsive efficiency due to wheel drag. However, the extended skirts shown in the art also impact the aerodynamic pressure on the lower wheel surfaces, where propulsive counterforces delivered at the axle have a mechanical advantage over lower wheel drag forces.

As mentioned, diverting wind from impinging on the lower wheel surfaces actually increases overall vehicle drag, reducing propulsive efficiency. Deflecting wind from impinging on these lower wheel surfaces transfers the aerodynamic pressure from these slower moving surfaces also suffering a mechanical disadvantage, to faster moving vehicle body surfaces having no mechanical advantage over propulsive counterforces, thereby increasing vehicle drag.

Nevertheless, numerous examples in the art demonstrate the current preference for aerodynamic skirts extending to below the level of the axle. For example, in U.S. Pat. No. 7,942,471 B2, US 2006/0152038 A1, U.S. Pat. Nos. 6,974, 178 B2, 8,303,025 B2, 7,497,502 B2, 8,322,778 B1, 7,806, 464 B2, US 2010/0066123 A1, U.S. Pat. Nos. 8,342,595 B2, 8,251,436 B2, 6,644,720 B2, 5,280,990, 5,921,617, 4,262, 953, 7,806,464 B2, US 2006/0252361 A1, U.S. Pat. No. 4,640,541 all make no mention of the differing relationships between upper wheel drag forces and lower wheel drag forces affecting vehicle propulsive efficiency. Most of these patents depict figures showing skirts extending well below the level of the axle. And an examination of leading trailer skirt manufacturers shows the prevalence for extended height skirts currently for sale and needed to meet California carbon emission requirements.

Furthermore, a recent in-depth wind tunnel study sponsored the US Department of Energy and conducted at a pre-eminent research institution of the United States government, Lawrence Livermore Laboratory was published Mar. 19, 2013, "Aerodynamic drag reduction of class 8 heavy vehicles: a full-scale wind tunnel study", Ortega, et. al, and concluded that trailer skirts are one of the most effective means to reduce drag on large tractor-trailer trucks. A large number of trailer skirt configurations were tested in this study, which employed traditional techniques for measuring total drag on the vehicle. Due to the nonlinear effects of upper wheel drag in rising headwinds, such techniques can produce inaccurate measurements of gains in propulsive efficiency for vehicles having wheels exposed to headwinds. Thus, as yet this important relationship of upper wheel drag more predominately affecting overall vehicle drag—and especially over lower wheel drag which is often comparatively negligible and suffers a mechanical disadvantage against propulsive counterforces applied at the axle—has gone unrecognized.

And in the patent art cited above, several patents such as U.S. Pat. Nos. 4,262,953, 4,640,541, US 2006/0252361 A1, U.S. Pat. Nos. 7,806,464 B2, 8,322,778 and others depict wind-deflecting panels generally spanning the lateral width of the trailer, thereby inducing unnecessary drag by blocking air otherwise funneled between the wheels. Funneled air into the rear of the vehicle can reduce pressure drag on the vehicle. In the art, there are numerous other examples of devices attempting to enhance this vehicle drag reducing effect.

Also in the cited art above, several patents such as US 2010/0066123 A1, U.S. Pat. Nos. 8,342,595 B2 and 8,251,436 B2 depict wind deflecting panels where aligned in front of the wheels of the trailer extending to well below the level of the axle, thereby inducing unnecessary vehicle drag by transferring drag from the slower moving lower wheel surfaces having a mechanical disadvantage, to the faster moving vehicle body and frame surfaces. And in the art, there are numerous other examples of devices attempting to enhance this wheel drag reducing effect.

And in the art, several attempts have been made to reduce the pressure drag induced on the body of the vehicle. For example, the oscillating system in U.S. Pat. No. 9,487,250—intended to reduce pressure drag on the vehicle itself—introduces considerable complexity over more common fixed drag-reduction means, since it generally includes a moving diaphram that must be tuned for the specific operating configuration of the vehicle. And the oscillating mechanism is generally attached at the rear of the trailer, behind the rear wheels.

And the adjustable skirts in U.S. Pat. No. 9,440,689, as well as the skirts in U.S. Pat. No. 8,783,758, both being located rearward of the trailer wheel assembly, do not induce air to flow in-between the trailer wheels to yield a reduction in pressure drag on the vehicle. Instead, the aforementioned skirts prevent air flow from flowing laterally under the body of the vehicle. For example, as disposed the combination of the dual adjustable skirts of U.S. Pat. No. 9,440,689 directs air away from the 'pocket' of air formed immediately behind the trailer. And the skirts of U.S. Pat. No. 8,783,758 prevent air from flowing laterally inward under the rearmost portion of the trailer body.

And many trailer skirts in the art are generally disposed largely along the lateral sides of the trailer, and therefore do not induce air to flow generally in-between the wheel sets to thereby reduce pressure drag on the trailer body. Indeed, early configurations of trailer skirts were often disposed wholly along the outer lateral sides of the trailer body. However, more recent configurations include the forwardmost ends thereof being disposed slightly inset toward the longitudinal centerline of the vehicle body, since it has been found through testing that this outwardly slanted configuration further decreases overall vehicle drag.

As taught by prior inventions by the present applicant, one reason for this somewhat better performance is due to this outwardly slanted configuration providing improved shielding of the trailing wheels from impinging headwinds. And as discussed herein, in order to minimize vehicle drag, it is critically important to shield the uppermost portions of otherwise exposed wheels from headwinds while leaving lowermost wheel surfaces exposed to headwinds. The slanted skirts—extending laterally outwards toward the rear—generally partially shield the upper wheels, but also shield much of the lower wheels, thereby not optimally minimizing drag on the vehicle. And these outwardly slanted skirts also present a serious liability issue for trucks, since the outwardly directed air from the skirts can destabilize adjacent cyclists—especially bicycle riders—from passing trucks.

With the numerous embodiments for shielding open wheels of the vehicle—which include prior inventions by the present applicant in U.S. Pat. No. 9,567,016 as well as in U.S. Pat. No. 9,796,430—teaching the critical importance of specifically shielding the critical drag-inducing upper wheel using a minimal drag-inducing wheel fairing, only further reinforces in the art the preference by skilled artisans for even further deepening the outwardly slanting arrangement of conventional trailer skirts to provide even more effective shielding of the trailing wheels from headwinds. As such, skilled artisans have had no motivation to consider a contrary arrangement further exposing the rearward wheels to headwinds, since such a contrary arrangement would be known to substantially increase drag on the vehicle.

For example, in U.S. Pat. No. 9,809,260 air deflectors are used in some embodiments to direct air outward away from the undercarriage components—and thereby away from flowing in-between the wheel sets—in order to reduce drag on these components. As such, it has remained generally unappreciated in the art that any increased drag induced on these undercarriage components could be insufficient to offset the overall drag reduction gains achievable simply by instead redirecting substantial air flow in-between the trailer wheel sets to thereby substantially reduce pressure drag on the vehicle.

Other previous attempts to reduce pressure drag induced on the body of the vehicle employed an air capture system to redirect air from the front to the rear of the vehicle, often including air ducts. For example, in U.S. Pat. No. 9,527,534 air ducts are used to capture air impinging near the front of the vehicle and communicating the thus captured air to rear of the vehicle through these ducts. The air ducts are generally directed either over the top or underneath the vehicle, while also generally extending rearward of the trailer wheel assembly. And such, these lengthy air ducts have substantial surface areas, introducing considerable friction drag thereon—on surfaces thereof both within and without the duct itself—to thereby limit any reduction in overall vehicle drag gained from any reduction in pressure drag on the vehicle itself.

And in U.S. Pat. No. 9,403,563 much smaller air ducts were used on the rear of the trailer, which still introduce considerable friction drag for their relatively small size, especially when considering that the their smaller size severely limits the potential amount of redirected air, thereby further limiting their effectiveness in increasing the effective pressure developed in the relatively large volume of reduced pressure zone located immediately behind the trailer. Thus, these smaller air ducts redirecting smaller volumes of air also have limited potential to reduce the overall pressure drag on the vehicle.

For these multiple reasons, a different approach is needed to reduce pressure drag on the vehicle, by using a minimal drag-inducing air diverting means to substantially increase the effective air pressure developed immediately behind the vehicle.

SUMMARY

Numerous embodiments for shielding open wheels of the vehicle—which include prior inventions by the present applicant in U.S. Pat. No. 9,567,016—are first presented herein, as the claimed embodiment itself can be even more effective in reducing overall vehicle drag when used in conjunction with such upper wheel-shielding embodiments. And as a present claimed embodiment may be more fully understood and appreciated when considered with a comprehensive understanding of the importance of inducing more air flow to the rear of the vehicle using a minimal drag-inducing air diverting means, additional further embodiments disposed ahead of the rearward wheel assembly are also presented herein as further background in support of the claimed embodiment. Since until recently prior embodiments shielding the upper wheel were largely unappreciated by those skilled in the art, the significance of both the further and claimed embodiments may be more fully understood and appreciated when considered with a comprehensive understanding of the importance of specifically shielding the critical drag-inducing upper wheel using a minimal drag-inducing fairing, as taught previously in U.S. Pat. No. 9,567,016—as well as in U.S. Pat. No. 9,796,430—by the present applicant.

Embodiments presented comprise either wind-diverting skirts or panels for use on vehicles having wind-exposed wheels on a wheel assembly mounted underneath the vehicle body, such as on the trailers of large commercial trucks. Many of the embodiments are designed to deflect vehicle headwinds from directly impinging on the upper wheel surfaces—the predominate drag inducing surfaces on a wheel—and onto the lower wheel surfaces—the least effective drag inducing surfaces on a wheel—thereby reducing vehicle drag and increasing vehicle propulsive efficiency. Each of these wheel shielding embodiments are also ideally designed to keep the lower wheel surfaces exposed to headwinds. Since propulsive counterforces applied at the axle have a natural mechanical advantage over lower wheel drag forces, deflecting headwinds onto fully exposed lower wheels surfaces also increases vehicle propulsive efficiency.

An embodiment comprises an inclined aerodynamic deflector panel assembly designed to deflect headwinds otherwise impinging on upper wheel surfaces downward onto lower wheel surfaces of a trailing wheel set on either side of the wheel assembly. The deflector panel assembly can be a generally flat panel tilted to deflect air downward onto the lower wheel surfaces, or a panel with perpendicular end plates projection forward forming a U-shaped channel arranged to funnel air downward onto the lower wheel surfaces. The deflector panel assembly extends down from the vehicle body to no lower than the level of the axle of the wheel assembly, and may included wheel skirts covering the trailing wheel sets. The panel may also be extended across the lateral width of the trailer to deflect headwinds below the trailing central axle assembly.

An embodiment comprises an aerodynamic skirt panel assembly designed to deflect headwinds otherwise impinging on upper wheel surfaces downward onto lower wheel surfaces of a trailing wheel set on either side of the wheel assembly. Toward the front end, the skirt panel assembly is located substantially inboard toward the centerline of the vehicle. Toward the rear end, the skirt panel assembly diverges rapidly to the outside of the trailing wheel set in order to divert headwinds in part onto the lower wheel surfaces. The ideal skirt assembly extends down from the vehicle body to no lower than the level of the axle in front of the wheel assembly, and may include wheel skirts covering the trailing wheel sets.

An embodiment comprises a method for reducing the total drag-induced resistive forces upon the wheel assembly as directed against the vehicle to reduce the required effective vehicle propulsive counterforce.

A different embodiment comprises an inwardly slanting aerodynamic trailer skirt disposed underneath the body of a semitrailer. The slanted trailer skirt has a rearmost end thereof located substantially inboard toward the longitudinal centerline of the trailer body and laterally apart from the forwardmost end thereof, which is instead located more toward an outer lateral side of the trailer body. So disposed, the slanted trailer skirt induces headwinds flowing largely there-alongside to be re-directed substantially inward to flow underneath the trailer body, thereby increasing air flow largely in-between the wheel sets of the trailing axle assembly. The increased airflow in-between the wheel sets causes relative increased air pressure to be developed immediately behind the trailer itself—reducing pressure drag being developed between the front to the back of the vehicle—thereby yielding an overall reduction in vehicle drag.

And a further different embodiment comprises an inwardly slanting mud flap disposed underneath the body of a semitrailer. The slanted mud flap has a rearmost end thereof located substantially inboard toward the longitudinal centerline of the trailer body and laterally apart from the forwardmost end thereof, which is instead located more toward an outer lateral side of the trailer body. So disposed, the slanted mud flap further streamlines the trailer body, yielding an overall reduction in vehicle drag.

And a claimed embodiment herein comprises a medial inner skirt panel centrally located substantially in-between the forward and rearward wheels of a tandem wheel assembly on a semitrailer, thereby further streamlining the vehicle to reduce drag thereon. The medial inner skirt panel further stabilizes the generally static air passing under central axle and through the central tandem open-space underneath the tandem wheel assembly, further increasing the effective air pressure being developed immediately behind the trailer to reduce drag thereon. A forward inner skirt panel located ahead of the rearward wheels of a tandem wheel assembly on a semitrailer also similarly streamlines the vehicle, reducing drag thereon. And a rearward inner skirt panel located behind the rearward wheels of a tandem wheel assembly on a semitrailer also similarly streamlines the vehicle, reducing drag thereon.

DESCRIPTION OF THE DRAWINGS

While one or more aspects pertain to most wheeled vehicles not otherwise having fully shielded wheels that are completely protected from oncoming headwinds, the embodiments can be best understood by referring to the following figures.

In FIG. 21, an inwardly slanting aerodynamic trailer skirt 90 is shown disposed underneath a semitrailer, extending from proximate to the landing gear 84 to near the rearward wheel assembly. The slanted trailer skirt is shown used in combination with an aerodynamic wheel deflector panel 45 and with inwardly slanting aerodynamic mud flaps 94 and 96.

In FIG. 22, the inwardly slanting aerodynamic trailer skirt and mud flaps of FIG. 21 is shown in side view disposed underneath a semitrailer.

In FIG. 25, an inwardly slanting aerodynamic trailer skirt 90 is shown disposed underneath a semitrailer, extending first alongside the lateral sides of the trailer from near the landing gear 84 before slanting laterally inwards in a curved manner to near the rearward wheel assembly. The slanted trailer skirt is shown used in combination with an aerodynamic wheel deflector panel 45 and with an inwardly slanting curved trailer skirt 91 disposed underneath the rearmost portion of a semitrailer.

In FIG. 26, the inwardly slanting aerodynamic trailer skirts of FIG. 25 are shown in side view disposed underneath a semitrailer.

DESCRIPTION OF WHEEL DRAG MECHANICS

As mentioned, drag force on exposed wheels increases more rapidly on upper wheel surfaces than on vehicle frame surfaces, causing a non-linear relation from rising wind speeds between net drag forces on vehicle frame surfaces versus net drag forces on vehicle wheel surfaces. Thus, vehicles having wind-exposed wheels are particularly sensitive to external headwinds reducing propulsive efficiency. As a result, there exists a need for an improved aerodynamic deflector and skirt for use on industrial trucks and trailers.

Because of this rising dominance of wheel drag in rising headwinds—due to the non-linear relation from rising wind speeds between net drag forces on vehicle frame surfaces versus net drag forces on vehicle wheel surfaces—a discussion of the wheel drag mechanics central to this non-linear relationship is presented herein. The upper wheel fairing is described below as a simple solution for reducing vehicle drag in rising headwinds on a cycle, and is presented herein as background for the present embodiment.

Figure 11:
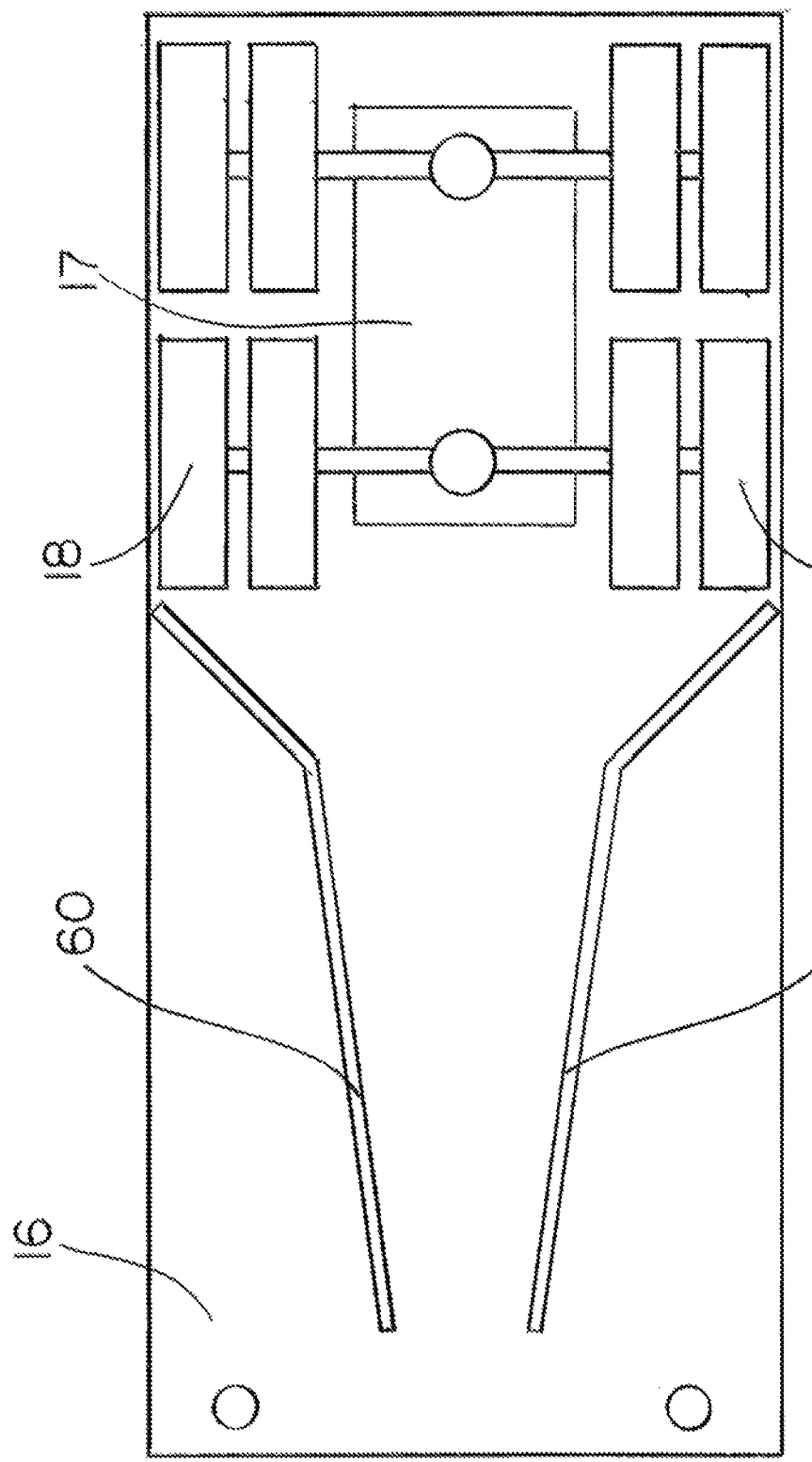
In FIG. 11, the aerodynamic deflector skirt assembly of FIG. 10 is shown from below the vehicle.

The shielding provided by fairing 1 in FIG. 11 is particularly effective since aerodynamic forces exerted upon exposed vehicle surfaces are generally proportional to the square of the effective wind speed impinging thereon. Moreover, the power required to overcome these drag forces is generally proportional to the cube of the effective wind speed. Thus, it can be shown that the additional power required to overcome these drag forces in propelling a vehicle twice as fast over a fixed distance, in half the time, increases by a factor of eight. And since this power requirement is analogous to rider effort—in the case of a bicycle rider—it becomes critical to shield the most critical drag-inducing surfaces on a vehicle from oncoming headwinds.

Figure 14:
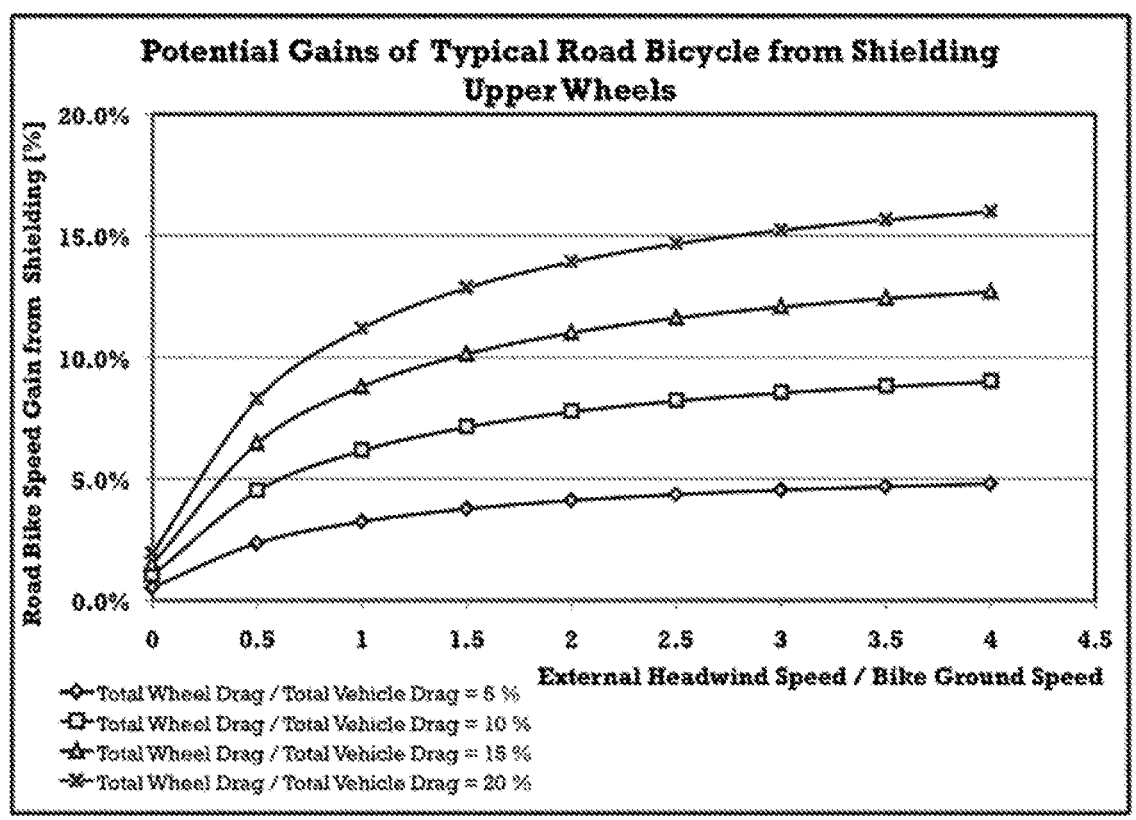
FIG. 14 is a series of curves showing the results of an analysis of the drag mechanics on a bicycle with shielded upper wheels, indicating that a bicycle with shielded upper wheels is faster when facing headwinds. Several curves are displayed, as examples of different bicycles each having a different proportion of wheel-drag to total-vehicle-drag.

FIG. 14 shows the results of an analysis of the drag mechanics on a bicycle with shielded upper wheels. The curves indicate that a bicycle with shielded upper wheels is faster when facing headwinds. Moreover, the gains in propulsive efficiency are shown to quickly increase in only a modest headwind, but continue to rise as headwinds increase further.

In any wheel used on a vehicle, and in the absence of any external headwinds, the effective horizontal wind speed at a point on the wheel at the height of the axle is equal to the ground speed of the vehicle. Indeed, the effective headwind speed upon any point of the rotating wheel depends on that point's current position with respect to the direction of motion of the vehicle.

Notably, a point on the moving wheel coming into direct contact with the ground is necessarily momentarily stationary, and therefore is not exposed to any relative wind speed, regardless of the speed of the vehicle. While the ground contact point can be rotating, it is not translating; the contact point is effectively stationary. And points on the wheel nearest the ground contact point are translating with only minimal forward speed. Hence, drag upon the surfaces of the wheel nearest the ground is generally negligible.

Contrarily, the topmost point of the wheel assembly (opposite the ground) is exposed to the highest relative wind speeds: generally at least twice that of the vehicle speed. And points nearest the top of the wheel are translating with forward speeds substantially exceeding the vehicle speed. Thus, drag upon the surfaces of the upper wheel can be quite substantial. Lower points on the wheel are exposed to lesser effective wind speeds, approaching a null effective wind speed—and thus negligible drag—for points nearest the ground.

Figure 17:
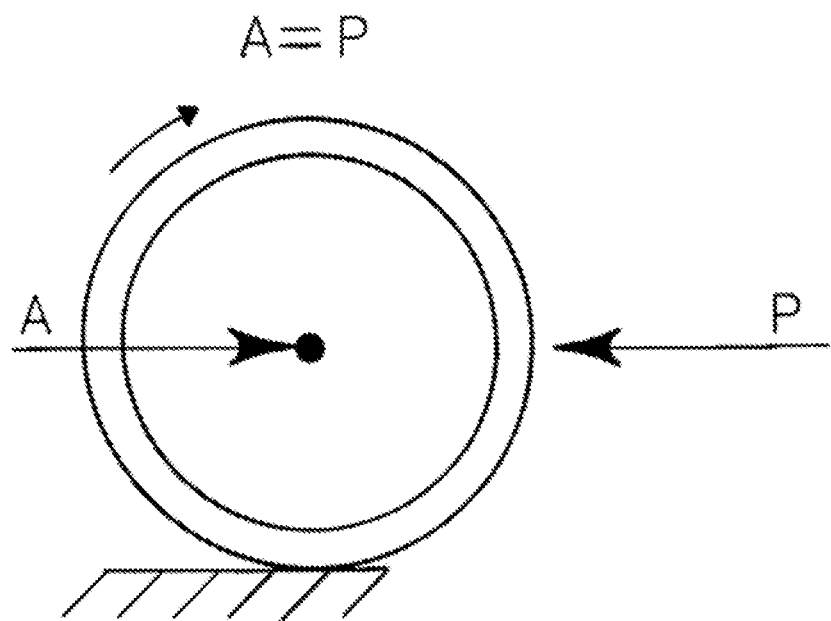
FIG. 17 (Prior Art) is a diagram of a wheel rolling on the ground representing typical prior art models, showing the net pressure drag force (P) exerted upon the forward wheel vertical profile—which moves at the speed of the vehicle—being generally centered near the axle of the wheel and balanced against the propulsive force (A) applied at the axle.
Figure 18:
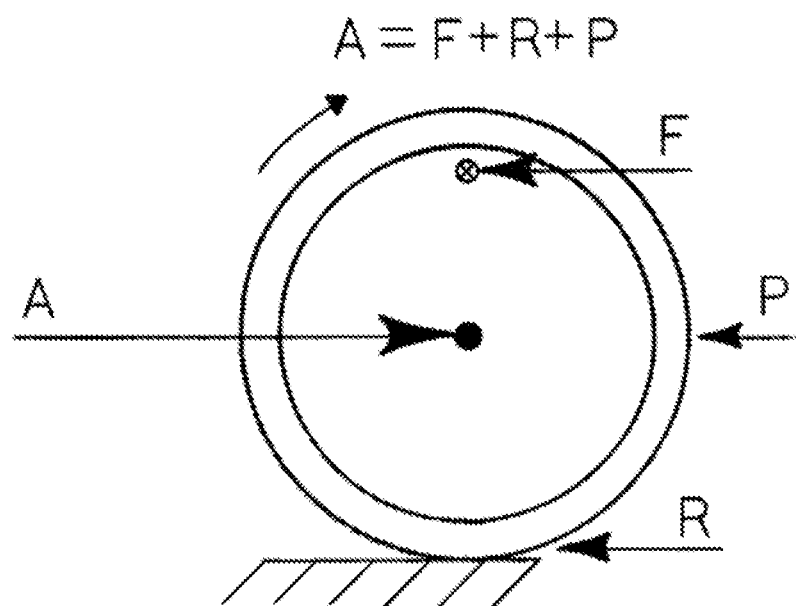
FIG. 18 is a diagram of a wheel rolling on the ground, showing the net friction drag force (F) upon the wheel surfaces—which move at different speeds depending on the elevation from the ground—being offset from the axle and generally centered near the top of the wheel. A ground reaction force (R)—arising due to the drag force being offset near the top of the wheel—is also shown. The force (A) applied at the axle needed to overcome the combination of drag forces (F+P) and reaction force (R) is also shown.
Figure 19:
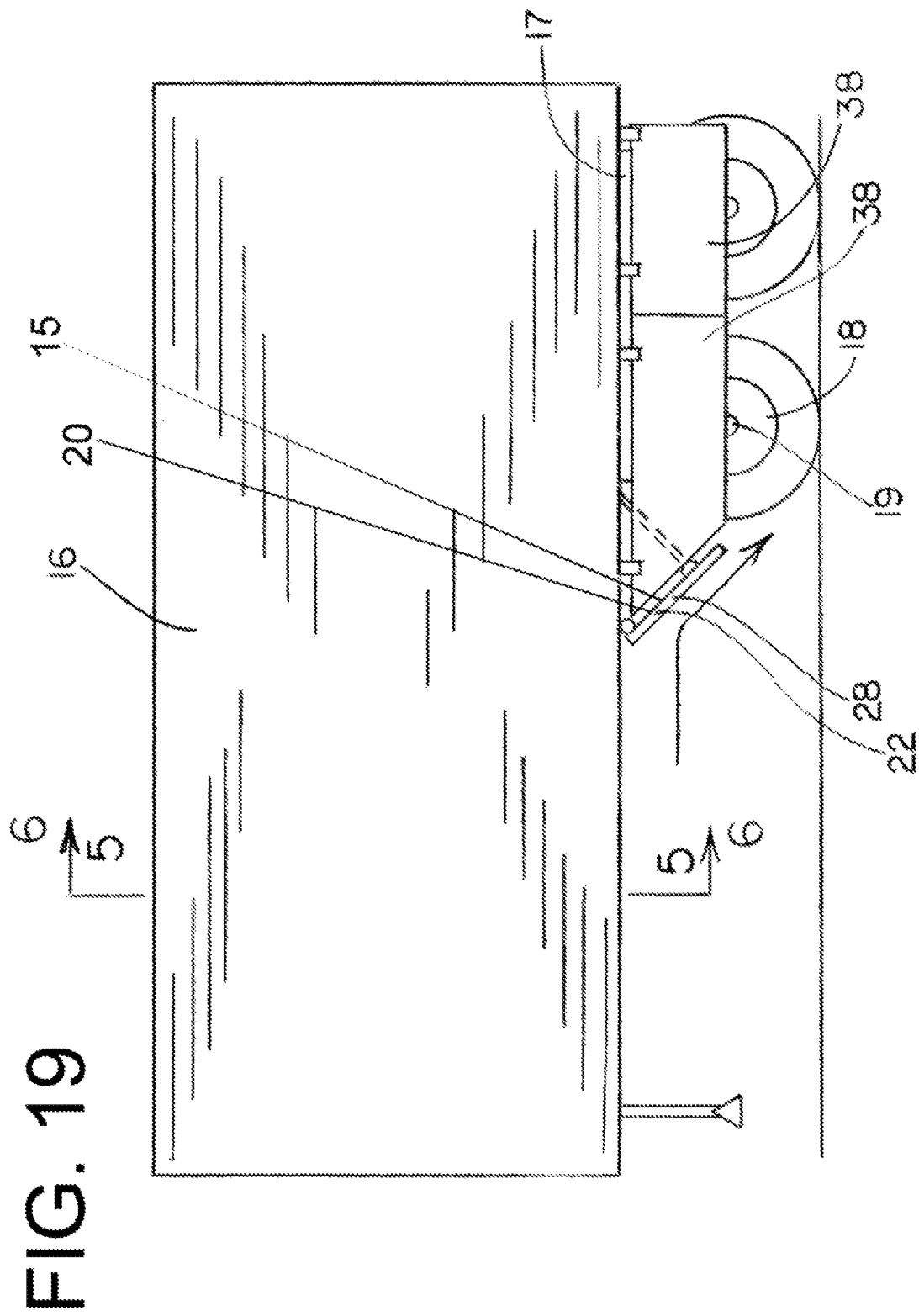
In FIG. 19, an inclined aerodynamic deflector panel and wheel skirt assembly is mounted underneath the trailer of an industrial truck.

Importantly, due to the rotating geometry of the wheel, it can be shown that the effective combined frictional drag force exerted upon the wheel is typically centered in closer proximity to the top of the wheel, rather than centered closer to the axle as has been commonly assumed in many past analyses of total wheel drag forces. While the net pressure (or form) drag (P) force on the forwardly facing profile of the wheel is generally centered with elevation and directed near the axle on the wheel (as shown in FIG. 17), the net frictional drag force (F) upon the moving surfaces is generally offset to near the top of the wheel (as shown in FIG. 18).

Indeed, it is near the top of the wheel where the relative winds are both greatest in magnitude, and are generally oriented most directly opposed to the forward motion of rotating wheel surfaces. Moreover, in the absence of substantial external headwinds, the frictional drag exerted upon the lower wheel surfaces contributes relatively little to the net drag upon the wheel, especially when compared to the drag upon the upper surfaces. The combined horizontal drag forces (from pressure drag from headwinds deflected by both the leading and trailing wheel forwardly facing profiles, and from frictional drag from headwinds impinging upon the forwardly moving surfaces) are thus generally concentrated near the top of the wheel under typical operating conditions. Moreover, with the faster relative winds being directed against the uppermost wheel surfaces, total drag forces combine near the top to exert considerable retarding torque upon the wheel.

As mentioned, the horizontal drag forces are primarily due to both pressure drag forces generally distributed symmetrically across the forwardly facing vertical profiles of the wheel, and to winds in frictional contact with moving surfaces of the wheel. Pressure drag forces arise primarily from the displacement of air from around the advancing vertical profile of the wheel, whose circular outline moves at the speed at the vehicle. As discussed above, since the entire circular profile moves uniformly at the vehicle speed, the displacement of air from around the moving circular profile is generally uniformly distributed with elevation across the forwardly facing vertical profile of the wheel. Thus, these pressure drag forces (P, as shown in FIG. 17 and FIG. 18) are also generally evenly distributed with elevation across the entire forwardly facing vertical profile of the wheel, and centered near the axle. And these evenly distributed pressure drag forces arise generally in proportion only to the effective headwind speed of the vehicle.

Frictional drag forces (F, as shown FIG. 18), however, are concentrated near the top of the wheel where moving surfaces generally exceed vehicle speed—while the lower wheel surfaces move at less than the vehicle speed. Since drag forces are generally proportional to the square of the effective wind speed, it becomes apparent that with increasing wind speed, that these upper wheel frictional drag forces directed upon the moving surfaces increase much more rapidly than do pressure drag forces directed upon the forward profile of the wheel. Indeed, these friction drag forces generally arise in much greater proportion to an increasing effective headwind speed of the vehicle. Nevertheless, these increased frictional drag forces being directed on the upper wheel is only a partial factor contributing to augmented wheel drag forces being responsible for significantly retarded vehicle motion.

Significantly, both types of drag forces can be shown to exert moments of force pivoting about the point of ground contact. And as such, either type of drag force exerted upon the upper wheel retards vehicle motion considerably more than a similar force exerted upon a substantially lower surface of the wheel. Minimizing these upper wheel drag forces is therefore critical to improving propulsive efficiency of the vehicle.

Also important—and due to the rotating geometry of the wheel—it can be shown that the vehicle propulsive force on the wheel applied horizontally at the axle must substantially exceed the net opposing drag force exerted near the top of the wheel. These forces on a wheel are actually leveraged against each other, both pivoting about the same point—the point on the wheel which is in stationary contact with the ground—and which is constantly changing lateral position with wheel rotation. Indeed, with the geometry of a rolling wheel momentarily pivoting about the stationary point of ground contact, the lateral drag and propulsive forces each exert opposing moments of force on the wheel centered about this same point in contact with the ground.

Furthermore, unless the wheel is accelerating, the net torque from these combined moments on the wheel must be null: The propulsive moment generated on the wheel from the applied force at the axle must substantially equal the opposing moment from drag forces centered near the top of the wheel (absent other resistive forces, such as bearing friction, etc.). And the propulsive moment generated from the applied force at the axle has a much shorter moment arm (equal to the wheel radius) than the opposing moment from the net drag force centered near the top of the wheel (with a moment arm substantially exceeding the wheel radius)—since both moment arms are pivoting about the same stationary ground contact point. Thus, for these opposing moments to precisely counterbalance each other, the propulsive force applied at the axle—with the shorter moment arm—must substantially exceed the net drag force near the top of the wheel.

In this way, the horizontal drag forces exerted upon the upper surfaces of the wheel are leveraged against opposing and substantially magnified forces at the axle. Hence, a relatively small frictional drag force centered near the top of the wheel can have a relatively high impact on the propulsive counterforce required at the axle. Shielding these upper wheel surfaces can divert much of these headwind-induced drag forces directly onto the vehicle body, thereby negating much of the retarding force amplification effects due to the pivoting wheel geometry.

Moreover, since the propulsive force applied at the axle exceeds the combined upper wheel drag forces, a lateral reaction force (R, as shown in FIG. 18) upon the wheel is necessarily developed at the ground contact point, countering the combined unbalanced propulsive and drag forces on the wheel: Unless the wheel is accelerating, the reaction force at the ground, together with the upper wheel net drag forces (F+P), combine (A=F+R+P, as shown in FIG. 18) to countervail the lateral propulsive force (A) applied at the axle. This reaction force is transmitted to the wheel through frictional contact with the ground. In this way, an upper wheel drag force is further magnified against the axle. For these multiple reasons, it becomes crucial to shield the upper wheel surfaces from exposure to headwinds.

Given that the propulsive force (A) applied at the axle must overcome both the net wheel drag forces (F+P) and the countervailing lower reaction force (R) transmitted through the ground contact point, it can be shown that the net drag force upon the upper wheel can oppose vehicle motion with nearly twice the sensitivity as an equivalent drag force upon the static frame of the vehicle. Hence, shifting the impact of upper wheel drag forces to the static frame can significantly improve the propulsive efficiency of the vehicle.

Furthermore, as drag forces generally increase in proportion to the square of the effective wind speed, the more highly sensitive upper wheel drag forces increase far more rapidly with increasing headwind speeds than do vehicle frame drag forces. Thus, as the vehicle speed increases, upper wheel drag forces rapidly become an increasing component of the total drag forces retarding vehicle motion.

And given the greater sensitivity of speed-dependent upper wheel drag forces—as compared against vehicle frame drag forces—to the retarding of vehicle motion, considerable effort should first be given to minimizing upper wheel drag forces. And shielding the faster-moving uppermost surfaces of the wheel assembly from oncoming headwinds, by using the smallest effective fairing assembly, is an effective means to minimize upper wheel drag forces.

Contrarily, drag forces on the lower wheel generally oppose vehicle motion with reduced sensitivity compared to equivalent drag forces on the static frame of the vehicle. Propulsive forces applied at the axle are levered against lower wheel drag forces, magnifying their impact against these lower wheel forces. Shielding lower wheel surfaces can generally negate this mechanical advantage, and can actually increase overall drag on the vehicle.

Moreover, as discussed above, headwinds on the static frame generally exceed the speed of winds impinging on the lower surfaces of the wheel. Hence, frictional drag forces on the lower wheel surfaces are greatly reduced. Thus, it is generally counterproductive to shield the wheel below the level of the axle. Drag on a vehicle is generally minimized with upper wheel surfaces shielded from headwinds and with lower wheel surfaces exposed to headwinds.

Wheel drag sensitivity to retarding vehicle motion becomes even more significant in the presence of external headwinds. With external headwinds, the effective wind speed impinging on the critical upper wheel surfaces can well exceed twice the vehicle speed. Shielding protects the upper wheel surfaces both from external headwinds, and from headwinds due solely to vehicle motion.

Indeed, wheel surfaces covered by the shield are exposed to winds due solely to wheel rotation; headwinds are deflected. The effective drag winds beneath the shield are generally directed tangentially to rotating wheel surfaces, and vary in proportion to radial distance from the axle, reaching a maximum speed at the wheel rim equal to the vehicle speed, regardless of external headwinds. Since drag forces vary generally in proportion to the square of the wind speed, the frictional drag forces are considerably reduced on shielded upper wheel surfaces. Using these wind shields, shielded wheel surfaces are exposed to substantially reduced effective wind speeds—and to generally much less than half of the drag forces without shielding.

Diminished drag forces from external headwinds impinging on the slower moving lower surfaces of a rolling wheel generally oppose wheel motion with much less retarding torque than drag forces from winds impinging on the faster upper surfaces. Indeed, tests demonstrate that with upper shields installed on a suspended bicycle wheel, the wheel will spin naturally in the forward direction when exposed to headwinds. Without the shields installed, the same wheel remains stationary when exposed to headwinds, regardless of the speed of the headwind. And an unshielded spinning wheel will tend to stop spinning when suddenly exposed to a headwind. This simple test offers an explanation for the unexpected result and demonstrates that by minimally shielding only the upper wheel surfaces from external headwinds, the overall drag upon the rotating wheel can be substantially reduced.

Furthermore, as external headwinds upon a forwardly rotating vehicle wheel add relatively little frictional drag to the lower wheel surfaces—which move forward at less than the vehicle speed—but add far more significant drag to the upper wheel surfaces, which move forward faster than the vehicle speed and which can more significantly retard vehicle motion, shielding the upper wheel surfaces against headwinds is particularly beneficial. Since drag forces upon the wheel are generally proportional to the square of the effective wind speed thereon, and the additional drag on the wheel—and thereby on the vehicle—increases rapidly with headwinds, shielding these upper surfaces greatly reduces the power required to propel the vehicle. Moreover, the relative effectiveness of shielding upper wheel surfaces generally increases with increasing headwinds.

Figure 15:
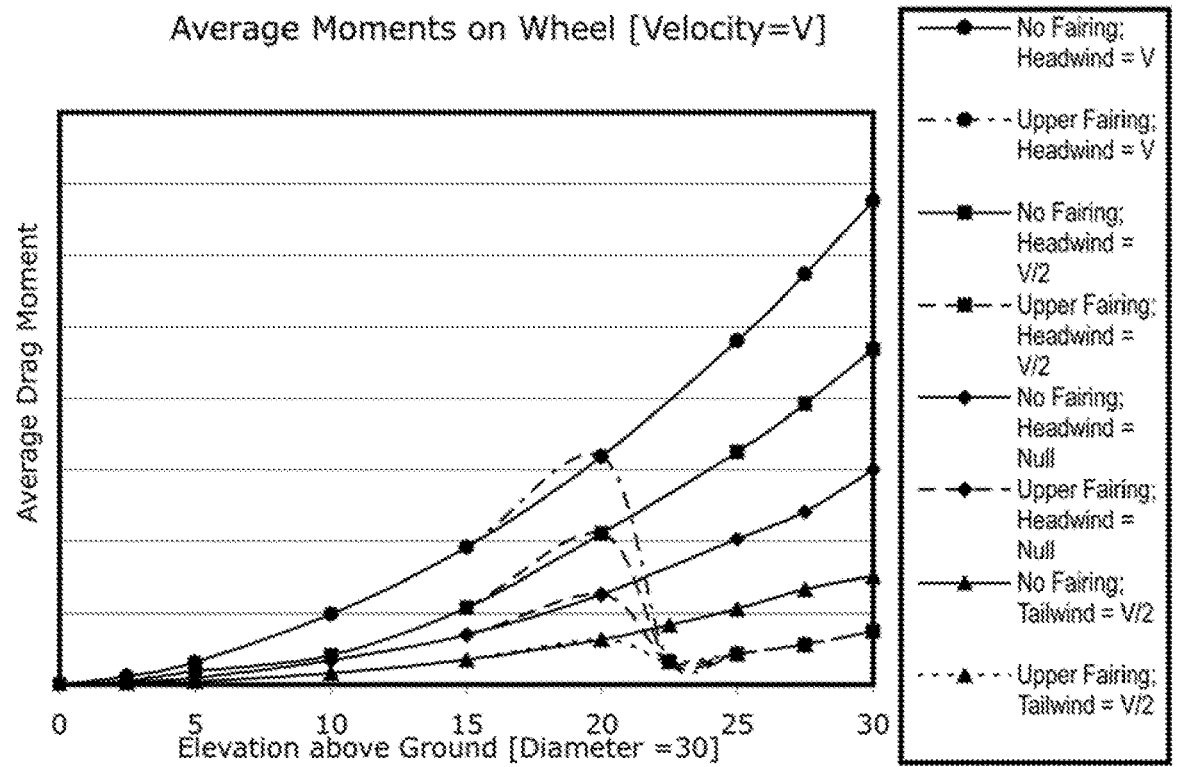
FIG. 15 shows a plot of calculated average moments—about the ground contact point—of drag force, that are exerted upon rotating wheel surfaces as a function of the elevation above the ground. The relative drag forces are determined from calculated wind vectors for the rotating surfaces on a wheel moving at a constant speed of V, and plotted for several different wind and wheel-surface shielding conditions. Specifically, relative magnitudes in average drag moments about the ground contact point as a function of elevation are plotted, for eight conditions: comparing with (dashed lines) and without (solid lines) shielding covering the upper third of wheel surfaces, for tailwinds equal to half the vehicle speed; for null headwinds; for headwinds equal to half the vehicle speed; and for headwinds equal to the vehicle speed. The rising solid curves plotted show the highest moments to be near the top of the wheel, while the dashed curves show the effect of the upper shield in substantially reducing the average drag moments on the rotating wheel.
Figure 16:
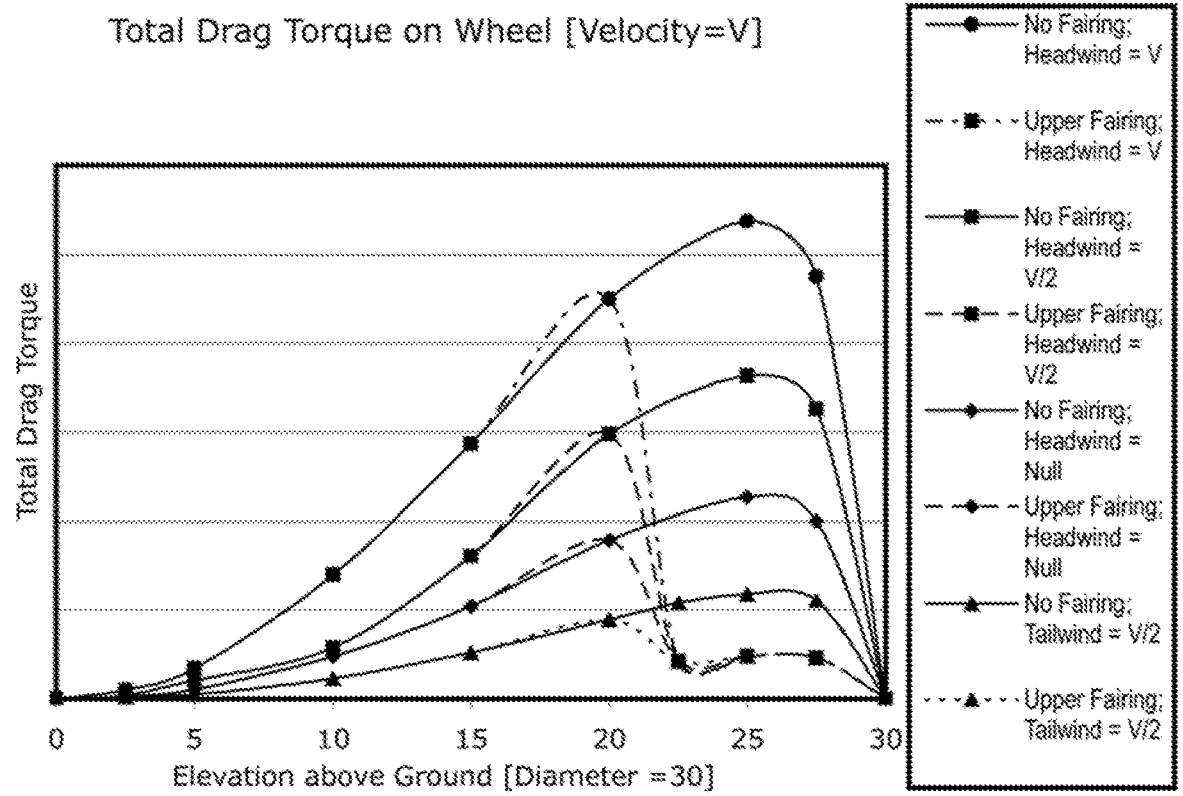
FIG. 16 shows a plot of calculated relative drag torque exerted upon rotating wheel surfaces as a function of elevation above the ground. The relative total drag torques are determined from the calculated average moments in combination with the chord length at various elevations on a wheel moving at a constant speed of V, for several different wind and wheel-surface shielding conditions. Relative magnitudes in total drag torque about the ground contact point as a function of elevation are plotted for eight conditions: comparing with (dashed lines) and without (solid lines) shielding covering the upper third of wheel surfaces, for tailwinds equal to half the vehicle speed; for null headwinds; for headwinds equal to half the vehicle speed; and for headwinds equal to the vehicle speed. The areas under the plotted curves represent the total torque from frictional drag on wheel surfaces. Comparing the differences in area under the plotted curves reveals the general trend of the upper shield to substantially reduce the total drag torque on the rotating wheel.

An examination of the retarding wind vectors on a rotating wheel can reveal the large magnitude of drag retarding moments upon the uppermost wheel surfaces, relative to the lower wheel surfaces. And an estimate of the frictional drag torque on the wheel can be determined by first calculating the average moments due to drag force vectors at various points—all pivoting about the ground contact point—on the wheel (results shown plotted in FIG. 15), and then summing these moments at various wheel elevations above the ground and plotting the results (FIG. 16). The area under the resulting curve (shown in FIG. 16 as a series of curves representing various headwind conditions) then represents the total frictional drag (absent profile drag) torque upon the wheel.

In order to determine the relationship between this torque and elevation on the wheel, the magnitudes of the drag wind vectors that are orthogonal to their corresponding moment arms pivoting about the point of ground contact must first be determined. These orthogonal vector components can be squared and then multiplied by the length of their corresponding moment arms, in order to determine the relative moments due to drag at various points along the wheel rim.

The orthogonal components of these wind vectors tend to increase linearly with elevation for points on the rim of the wheel, and also for points along the vertical mid-line of the wheel. Calculating the moments along the vertical mid-line of the wheel can yield the minimum relative drag moments at each elevation. Calculating an average of the maximum drag moment at the rim combined with the minimum drag moment along the mid-line can then yield the approximate average drag moment exerted at each elevation upon the wheel. Multiplying this average drag moment by the horizontal rim-to-rim chord length can yield an estimate of the drag torque exerted upon the wheel at each elevation level (FIG. 16). These calculations are simply determined from the geometry of the rotating wheel; the object of this analysis is to determine the likely relative magnitudes of drag torques upon the wheel at various elevations.

From the resulting plots (FIG. 16), it can be estimated that the uppermost approximate one-third section of the wheel likely contributes most of the overall drag torque upon the wheel. Thus, by shielding this upper section from headwinds, drag torque can be considerably reduced. With upper-wheel shielding, as noted above, the relative winds beneath the shield are due mostly to wheel rotation, and are generally directed tangentially to the wheel. The resulting drag torque under the shielded sections can then be determined as above, and compared with the unshielded drag torque for similar headwind conditions.

These calculations—generally confirmed by tests—indicate a substantial reduction in retarding drag torque upon the shielded upper wheel surfaces. In the absence of external headwinds, the plots of FIG. 16 indicate that shielding the uppermost approximate one-third section of the wheel can reduce the drag torque of this section considerably, by as much as 75 percent. Moreover, repeating calculations and testing with an external headwind equal to the vehicle speed indicates that upper wheel shielding can reduce the comparative upper wheel drag torque of this section by still more, perhaps by as much as 90 percent. Hence, the potential effectiveness of shielding upper wheel surfaces can be significant, especially with surfaces having higher drag sensitivities, such as wheel spoke surfaces.

As discussed above, since upper wheel drag forces are leveraged against the axle—thereby magnifying the propulsive counterforce required at the axle—an increase in drag force on the wheels generally retards vehicle motion much more rapidly than does an increase in other vehicle drag forces. And while under external headwind conditions, the total drag on a vehicle with wheels exposed directly to headwinds increases still more rapidly with increasing vehicle speed.

Shielding upper wheel surfaces effectively lowers the elevation of the point on the wheel where the effective net drag force is exerted, thereby diminishing the magnifying effect of the propulsive counterforce required at the axle, as discussed above. As a result, the reduction in drag force upon the vehicle achieved by shielding the upper wheel surfaces is comparatively even more significant with increasing external headwinds. Shielding these upper wheel surfaces can thereby improve relative vehicle propulsion efficiency under headwinds by an even greater margin than under null wind conditions.

Moreover, shielding these upper wheel surfaces can be particularly beneficial to spoked wheels, as round spokes can have drag sensitivities many times greater than that of more streamlined surfaces. As round spokes—in some configurations—can have drag coefficients ranging from one to two orders of magnitude greater than corresponding smooth, streamlined surfaces, shielding the spokes of the upper wheel from external wind becomes particularly crucial in reducing overall drag upon the wheel.

Accordingly—given these multiple factors—a relatively small streamlined fairing attached to the vehicle structure and oriented to shield the upper surfaces of the wheel assembly from oncoming headwinds substantially reduces drag upon the wheel, while minimizing total drag upon the vehicle. Consequently, an embodiment includes the addition of such a fairing to any wheeled vehicle—including vehicles having spoked wheels, where the potential drag reduction can be even more significant.

The addition of such minimal fairings to each side of a traditional spoked bicycle wheel, for example, reduces windage losses and improves propulsive efficiency of the bicycle, particularly at higher cycle speeds or in the presence of headwinds, while minimizing cycle instability due to crosswind forces. Since crosswinds are a significant factor restricting the use of larger wheel covers, minimizing the fairing size is also an important design consideration. And minimizing form drag induced by the forward-facing profile of the fairing also will influence the fairing design. The preferred fairing size will likely substantially cover the upper section of the exposed wheel, and be placed closely adjacent to the wheel surfaces, consistent with general use in bicycles. In heavier or powered cycles, design considerations may permit somewhat larger fairings, covering even more of the wheel surfaces.

As shielding upper wheel surfaces can reduce overall drag on the vehicle, while simultaneously augmenting the total frontal profile area of the vehicle exposed to headwinds, a natural design constraint emerges from these competing factors: Shields should be designed sufficiently streamlined and positioned sufficiently close to wheel surfaces to provide reduced overall vehicle drag. And as shielding effectiveness potentially increases under headwind conditions, shields designed with larger surface areas and larger frontal profiles may still provide reduced overall vehicle drag under headwind conditions, if not under null wind conditions. Thus, a range of design criteria may be applied to selecting the best configuration and arrangement of the fairing, and will likely depend on the particular application. In any particular application, however, the embodiment will include a combination of design factors discussed above that will provide a reduction in overall vehicle drag.

In a cycle application, for example, fairings positioned within the width of the fork assembly will likely provide the most streamlined design which both shields spokes from headwinds but also minimizes any additional form drag profile area to the vehicle frame assembly. In other applications, insufficient clearances may preclude positioning the fairings immediately adjacent to moving wheel surfaces. In such situations, headwinds may be sufficient in magnitude to cause a reduction in overall vehicle drag to justify the use of wider upper wheel fairings—positioned largely outside the width of the fork assembly—with extended forward profile areas.

Furthermore, from the previous analysis a consideration the drag torque curves wholly above the level of the axle, it becomes apparent that shielding the wheel is best centered about an elevation likely between 75 and 80 percent of the diameter of the wheel, or near the center of the area under the unshielded torque curve shown in FIG. 16. While drag forces are generally greatest in magnitude near the top of the wheel, the effective exposed topmost surface areas are much smaller, thereby limiting the magnitude of drag torques upon the uppermost surfaces of the wheel. Thus, the upper wheel fairing would best extend above and below this critical level (generally, between 75 and 80 percent of the diameter of the wheel) in order to optimally minimize drag upon the wheel. And as the surfaces forward of the axle are the first to be impacted by headwinds, shielding these surfaces is essential to deflecting headwinds from the rearward surfaces. Thus, the higher-sensitivity drag-inducing surfaces in the forward upper quadrant and centered about this critical elevation on the wheel generally need to be shielded for optimal minimization of drag. These higher-sensitivity drag-inducing surfaces generally centered about this critical elevation and extending to include those surfaces with higher drag-inducing sensitivities that are positioned mostly in the forward upper quadrant of the wheel, but likely also to include much of the wheel surfaces positioned in the rearward upper quadrant, are herein defined and later referred to as: major upper drag-inducing surfaces. And the critical level about which the major drag-inducing surfaces are generally centered in elevation is herein defined and later referred to as: critical elevation.

As discussed, the precise elevation about which the major upper drag-inducing surfaces are centered, as well as the precise extent to which surfaces in the forward quadrant and in the upper half of the wheel are included in the major upper drag-inducing surfaces, will depend on the particular application and operating conditions. Certain wheel surfaces with higher drag sensitivities, such as wheel spokes, generally need to be shielded when positioned within the region of the major upper drag-inducing surfaces. Other surfaces such as smooth tire surfaces having lower drag sensitivities may also benefit from shielding if their surface areas are extensive, are positioned near the critical level in elevation, or are the primary upper wheel surfaces exposed to headwinds. In the example analysis of FIGS. 15 and 16, a uniform surface across the wheel having a constant drag-sensitivity was assumed. In any particular application, the unique combination of different wheel surfaces with differing drag sensitivities will determine the particular height of the critical elevation level about which the major upper drag-inducing surfaces are centered.

A similar analysis can be performed for form drag forces on the moving forward vertical profiles of the wheel rim or tire. The results obtained are generally similar in form, though may differ somewhat in magnitudes as the effective wind speeds on the moving profiles are generally lower on the upper wheel—equal to the vehicle speed—and will depend on the particular application, including the total area of the wheel forward profile exposed to headwinds, and to headwind and vehicle speeds. Nevertheless, the net pressure drag torque caused by the moving outline of the wheel is also centered above the level of the axle, and thereby merits consideration in determining the particular height of the critical elevation level, and in the ultimate configuration of the fairing.

Figure 13:
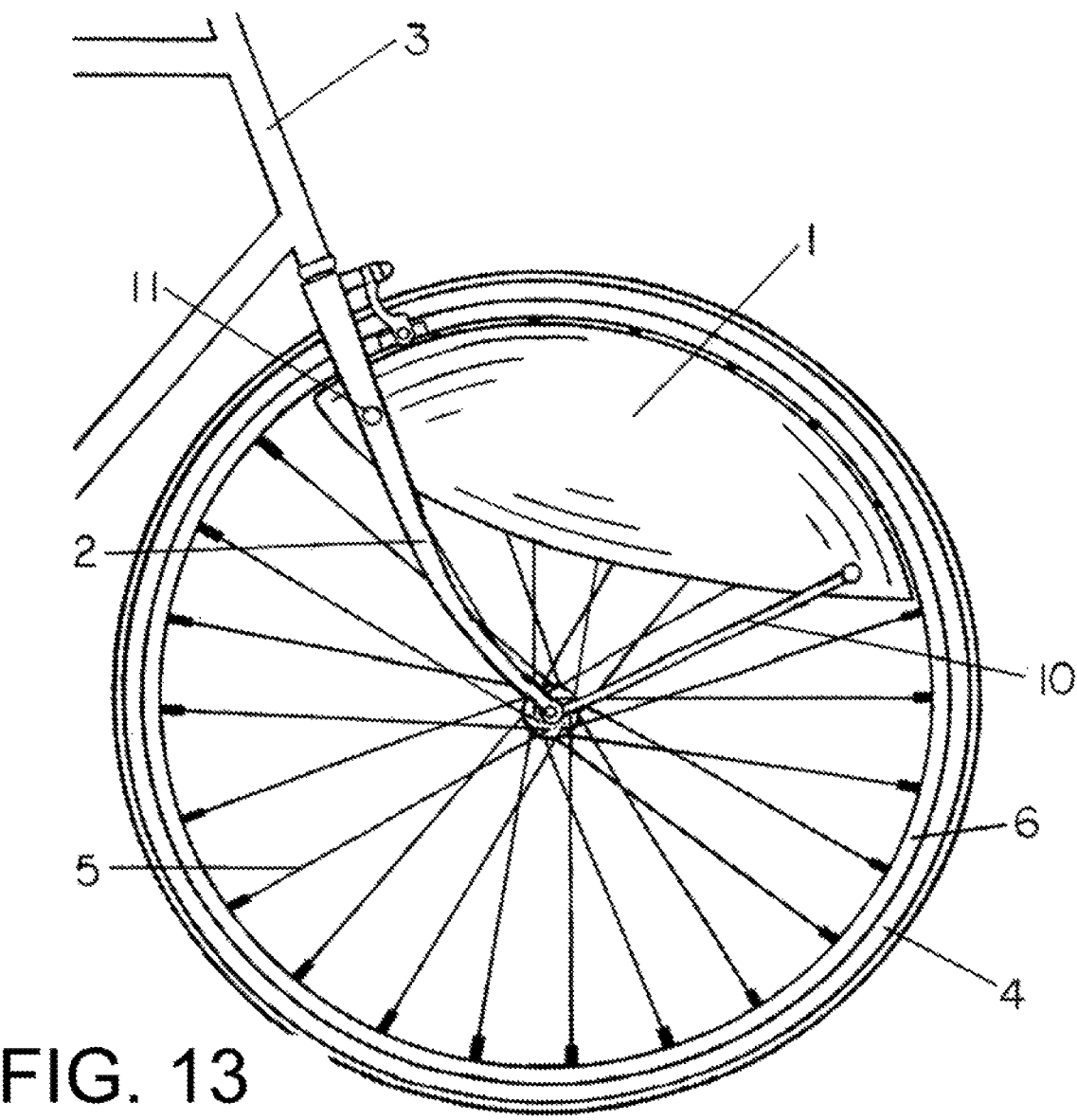
FIG. 13 is a front cycle wheel assembly, as typically found on a bicycle or motorcycle, where a fairing is attached and positioned as shown to each interior side of the fork assembly, thereby shielding the upper- and front-most surfaces of the spoked wheel from oncoming headwinds.

Hence, the fairing shown in FIG. 13 is best configured to shield the uppermost and forward wheel surfaces, and to extend rearward to at least partially shield the forward profile of the trailing portion of the upper wheel rim, consistent with the further requirement to extend downward as much as practical to the level of the axle. As mentioned, crosswind considerations will also influence the ultimate configuration for a particular application.

In consideration of further embodiments described below, the operating principles described above will generally apply, and may be referred thereto.

DETAILED DESCRIPTION

Various wheel-shielding embodiments are first described below in detail, each providing means to deflect headwinds from directly impinging on the upper wheel surfaces and onto the lower wheel surfaces of a trailing wheel assembly, thereby reducing vehicle drag and increasing propulsive efficiency. A different embodiment is then presented as the Fourteenth Embodiment, comprising an inwardly slanting aerodynamic trailer skirt disposed underneath the body of a semitrailer. A further different embodiment is then presented as the Fifteenth Embodiment, comprising an inwardly slanting mud flap disposed underneath the body of a semitrailer behind the rear wheel assembly. And finally, a claimed embodiment is then presented as the Sixteenth Embodiment, comprising an inner skirt panel disposed under a semitrailer and arranged to stabilize the air passing under central axle and through the central open-space within the tandem wheel assembly.

Figure 1:
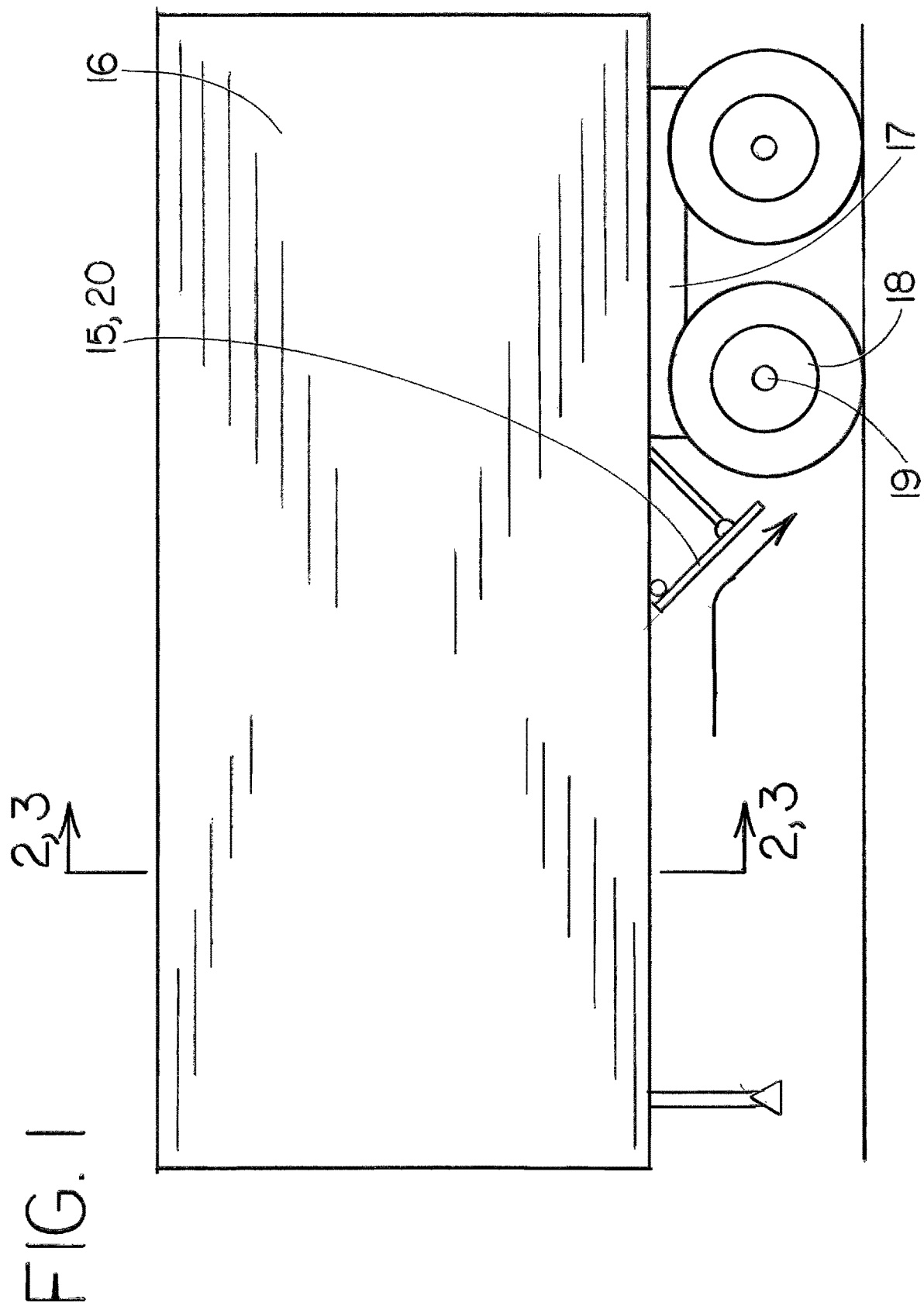
In FIG. 1, an inclined aerodynamic deflector panel assembly is mounted underneath the trailer of an industrial truck in front of a wheel set of the rear wheel assembly and rearward of the forward landing gear.
Figure 2:
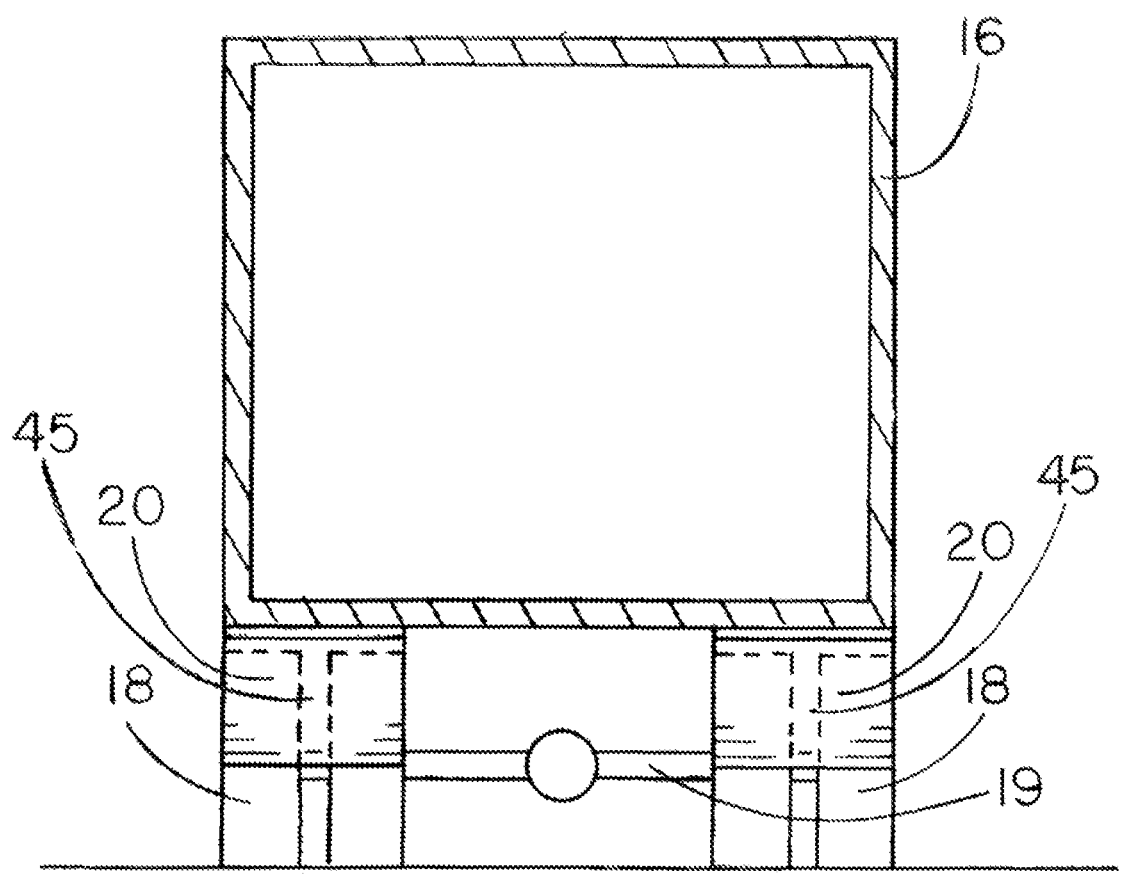
In FIG. 2, the inclined aerodynamic wheel deflector panel assembly of FIG. 1 is shown mounted on the trailer as viewed in cross-section from the front of the vehicle. Two deflector panel assemblies are shown, each as mounted in front of one of the wheel sets of the rear wheel assembly.

First Embodiment—FIGS. 1 and 2

As shown in FIGS. 1 and 2, an embodiment comprises an inclined aerodynamic wheel deflector panel assembly 20 attached to and mounted underneath the body of a trailer 16 for a commercial vehicle. The inclined wheel deflector panel assembly 20 is located forward of the rear wheel assembly 17 and located directly in front of a trailing wheel set 18 which would otherwise be exposed to headwinds when the vehicle is in forward motion. The inclined wheel deflector panel assembly 20 is planar in shape, mounted inclined in a forwardly-angled orientation with the upper edge more forwardly located and the lower surface located more rearward on the vehicle. The inclined wheel deflector panel assembly 20 spans the lateral width of the trailing wheel set 18 of the trailing rear wheel assembly 17 located on either side of the vehicle. The optimal inclined wheel deflector panel assembly 20 extends downward ideally to no lower than the level of the axle 19 and is located proximal to the trailing wheel set 18 in order to deflect upper wheel headwinds onto the exposed lower wheel surfaces.

It can be concluded from the discussion of wheel drag mechanics above, that since propulsive counterforces applied to the wheel at the axle have a mechanical advantage over lower wheel drag forces—which are necessarily applied to the wheel below the level of the axle—directing upper wheel headwinds onto the lower wheel surfaces can significantly reduce overall vehicle drag and improve propulsive efficiency. The reasons for these gains in vehicle efficiency become apparent by further considering how wheel drag forces compare with vehicle body drag forces.

As discussed earlier, drag forces on the wheel must be countered by a propulsive force from the vehicle body applied at the axle. And it can be established that drag forces on the upper wheel have a mechanical advantage over countervailing propulsive counterforces applied at the axle. And with the wheel deflector assembly attached to the vehicle body, drag on the deflector must also be countervailed by a propulsive counterforce applied to the vehicle body at a propulsive axle.

Thus, in order to determine the relative difference in total vehicle drag between the traditional extended height deflector diverting headwinds from impinging on both the upper and the lower wheels, and the improved reduced height deflector with the lower wheel surfaces ideally fully exposed to headwinds, the added vehicle drag derived from the surface of the deflector panel extending below the level of the axle must be compared against the vehicle drag arising from the corresponding additional surfaces of the lower wheel otherwise shielded by the extended deflector. And as already established above, the relative effects of these resistive forces on vehicle propulsion are non-linearly related, and vary considerably with increasing headwinds: for vehicles facing faster external headwinds the nonlinear effects quickly increase, as discussed above and as shown in FIG. 14, where the results of an analysis of the drag mechanics of a bicycle facing increasing headwinds shows rapid increases in propulsive efficiency by shielding the upper wheels.

A skilled artisan will recognize from the curves shown FIG. 14 that as the relative external headwind increases on the vehicle, so does the increase in propulsive efficiency of the vehicle. And a skilled artisan will also recognize that the natural design constraint described above for the cycle wheel fairing of FIG. 13 similarly applies to the wind deflecting fairing of the present embodiment.

This inherent design constraint implies that for a given vehicle under a given relative external headwind condition—as shown along the horizontal axis of the plots in FIG. 14—a wind-deflecting fairing of the present embodiment will similarly be constrained to have a limited overall wind-deflecting extent that will produce a reduction in overall vehicle drag. This limited wind-deflecting extent includes a limit on the total drag-inducing surface area extent of the wind-deflecting fairing, including a combined limit in both forward and downward extension of fairing surfaces.

And as discussed extensively above for the cycle wheel fairing of FIG. 13, the relative effects of drag forces on the fairing versus drag on the various points on the wheel are not simply related. Instead, the drag forces on various points on the wheel are magnified or de-magnified as applied against the axle, whereas the drag on either the cycle fairing or on the similar drag-inducing surfaces of the wind-deflecting fairing of the present embodiment are directly applied equivalently against the same axle.

Thus, since propulsive counterforces applied at the axle have a mechanical advantage over drag forces on the lower wheel surfaces, a simple comparison of the net drag force on either surface alone—either on the lower wheel or on the extended deflector surface—is entirely insufficient to determine the relative effect each has on vehicle propulsive efficiency. Instead, the magnitudes of the drag force from each surface must be reflected to an equivalent force applied at the same axle and compared against one another.

For the lower wheel surfaces, the net drag force as applied against the axle is diminished by leveraging about the point of ground contact, as previously discussed. For the lower deflector panel surface, the drag force is directed against the axle without magnification since it is transmitted directly through the body and frame of the vehicle. Although another axle of the vehicle may be the used as the propulsive axle, the two net drag forces must be compared against each other as reflected at the same affected axle in order to gauge their relative effects on overall vehicle drag.

For the lower deflector surface, the drag force on the surface is—like other vehicle body drag forces—directly countervailed by the propulsive counterforce applied at the driven axle. For the lower wheel surfaces, the situation is more complicated due both to the mechanical advantage that the propulsive forces have over lower wheel drag forces, and to the effects that the summation moments of drag force (FIG. 15) at different points on the rotating wheel have on the net lower wheel drag force.

As noted earlier under the Description of Wheel Drag Mechanics, and as shown in the plot of FIG. 16, the average drag torque exerted against the lower wheel surfaces has far less impact on the total wheel drag as exerted upon the vehicle than does the average drag torque exerted against the upper wheel surfaces. This is due largely to the pivoting geometry of the rotating wheel, where wheel forces are levered about the same stationary point of ground contact at the bottom of the wheel. Owing in part to their longer moment arms, drag forces applied to the upper wheel produce far greater resistive torques on the wheel than do drag forces applied to the lower wheel.

Consequently, drag forces on the upper wheel surfaces are ideally shifted to the lower wheel surfaces in order to benefit the propulsive efficiency of the vehicle. As a result, deflecting headwinds from the upper wheel surfaces onto the lower wheel surfaces can substantially reduce overall vehicle drag and improve propulsive efficiency.

And in the case of industrial trucks having large wheels with larger tires, the relative effects of resistive pressure drag forces on the wheel over frictional drag forces is exacerbated over that of a spoked bicycle wheel as described above in the discussion of the wheel drag mechanics. As mentioned, the spoked wheels with thin tires and rims used on a bicycle can produce significant frictional drag effects resisting vehicle propulsion. Trucks with smooth wheels and tires are more significantly affected by pressure drag forces acting against the upper wheel forward-facing profile surfaces, than are bicycles with thin tires and rims.

Thus for trucks, deflecting upper wheel headwinds downward onto the lower wheel becomes an important operating function. Since propulsive counterforces at the axle have a mechanical advantage over lower wheel drag forces applied to the wheel below the level of the axle, deflecting headwinds downward onto the lower wheel can reduce overall vehicle drag and improve propulsive efficiency.

The natural design constraint method discussed above can also be used in combination with an accounting for the non-linear effects on vehicle drag from drag forces directed on various points on the wheel to determine the limited extent of the wind-deflecting fairing of the present embodiment that will also yield an overall reduction in vehicle drag, including the combined limit in both forward and downward extent of the fairing. And as is evident from the curves of FIG. 14, the combined limit for the overall drag-inducing extent of the wind-deflecting fairing of the present embodiment will vary with both vehicle configuration and relative external headwind condition.

From an examination of the curves of FIG. 14, it becomes evident that the worst-case limit for the overall extent of the fairing is while the vehicle is operated under null wind conditions, where the relative gains in vehicle efficiency are comparatively minimal, and as shown at the left vertical axis of the plots of FIG. 14. As the relative external headwind increases, the relative gains in vehicle efficiency quickly increase, as shown in the general trend of the efficiency curves rising toward the right side of the plots.

Therefore, a skilled artisan then will understand that the most restrictive limit for the overall extent of the fairing will be while the vehicle is operated under null external headwinds conditions. If the extent of the fairing is sufficiently limited to produce an overall reduction in vehicle drag under null operating conditions, then the thus limited fairing will also produce even more gains in vehicle efficiency under an external headwind condition.

And from the discussion above, it becomes evident that the fairing could be designed either to be more limited in forward extent and more extensive in downward extent or alternatively could be designed instead to be more extensive in forward extent and more limited in downward extent, and still produce the same measure of gains in overall vehicle propulsive efficiency.

Thus, the fairing could be designed to be somewhat limited in forward extent and to extend somewhat below the level of the axle while still yielding a reduction in overall vehicle drag, especially while the vehicle is operated under a substantial relative external headwind condition. This potential configuration for the fairing becomes quite evident both from an examination of the curves of FIG. 16, and from a consideration of how the very limited mechanical disadvantage that surfaces of the wheel located not very far below the level of the axle have over vehicle frame drag forces, such as wheel fairing or deflector drag forces.

Indeed, FIG. 16 shows that near the level of the axle, much less relative gains in propulsive efficiency are gained from shielding more centrally located wheel surfaces in elevation than from shielding the uppermost wheel surfaces positioned substantially above the axle near the critical elevation. And FIG. 16 also shows that the relative gains in vehicle efficiency increase in rising relative external headwinds.

While the ideal configuration of the fairing includes a limit for fairing surfaces to extend downward to lower than the level of the axle, the discussion above makes clear that this is optimal limitation is not fully restrictive. Instead, a skilled artisan would recognize that a wind-deflecting fairing of the present embodiment could be designed to be somewhat limited in forward extent while also extending somewhat below the level of the axle while still yielding a reduction in overall vehicle drag, especially while the vehicle is operated under a variety of relative external headwind conditions.

Or alternatively, a wind-deflecting fairing of the present embodiment could be designed to be more extensive in forward extent, while being somewhat limited in extending to no lower than the level of the axle, while still yielding a reduction in overall vehicle drag, especially while the vehicle is operating under a variety of relative external headwind conditions. Thus, a variety of configurations for extending the surfaces of the wind-deflecting fairing of the present embodiment is included that will yield an effective reduction in overall vehicle drag.

In consideration of further embodiments described below, the operating principles described above will generally apply, and may be referred thereto.

Figure 3:
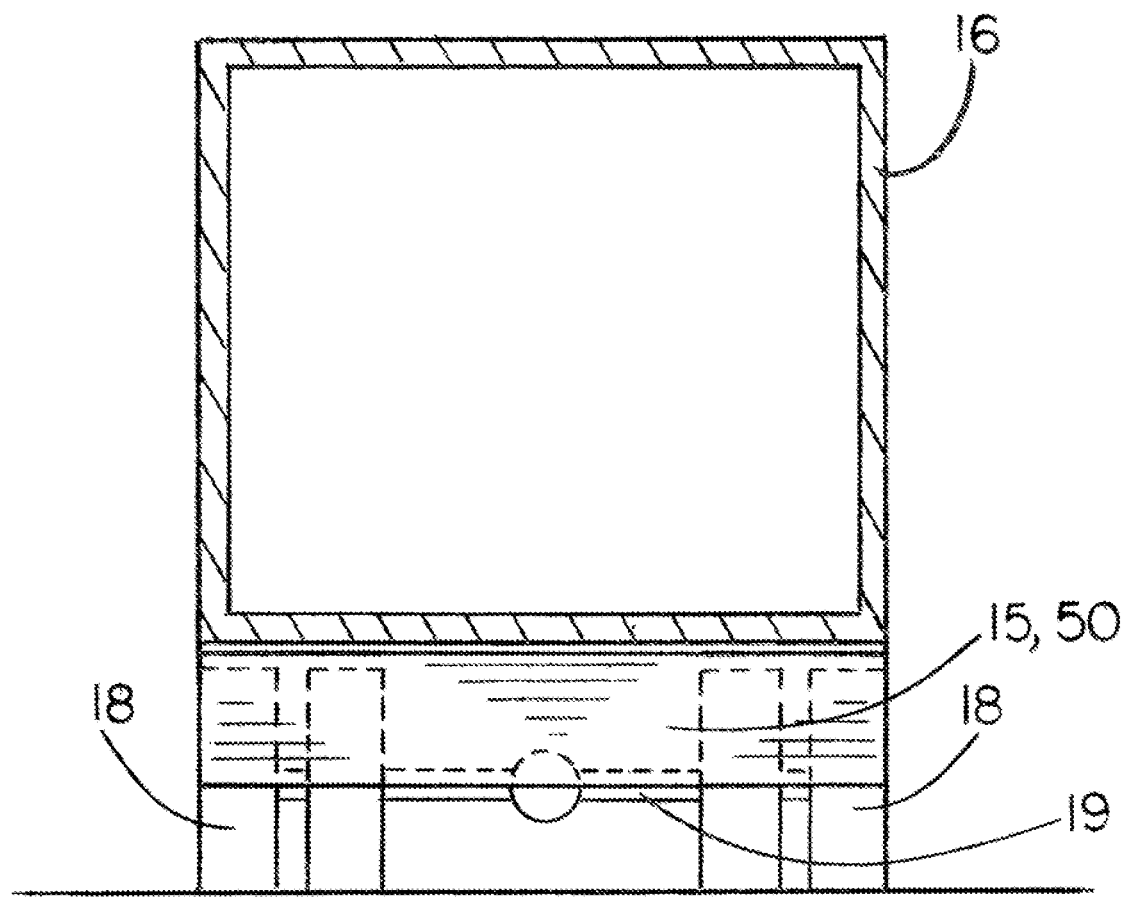
In FIG. 3, an inclined aerodynamic deflector panel assembly, which appears in side view similar to as shown in FIG. 1, is shown mounted on the trailer as viewed in cross-section from the front of the vehicle.

Second Embodiment—FIGS. 1 and 3

As shown in FIGS. 1 and 3, an embodiment comprises an inclined aerodynamic deflector panel assembly 15 attached to and mounted underneath the body of a trailer 16 for a commercial vehicle. The inclined deflector panel assembly 15 is located forward of the rear wheel assembly 17 and located in front of trailing wheel sets 18 which would otherwise be exposed to headwinds when the vehicle is in forward motion. The inclined deflector panel assembly 15 is planar in shape, mounted inclined in a forwardly-angled orientation with the upper edge more forwardly located and the lower surface located more rearward on the vehicle. The inclined deflector panel assembly 15 spans the lateral width of the trailer 17, and where aligned directly in front of the wheel sets 18 ideally extends downward to no lower than the level of the axle. The inclined deflector panel assembly 15 is located proximal to the trailing wheel assembly 18 in order to deflect headwinds onto the exposed lower wheel surfaces, and to deflect headwinds from directly impinging on the central axle assembly 19, thereby reducing overall vehicle drag and improving propulsive efficiency.

Figure 4:
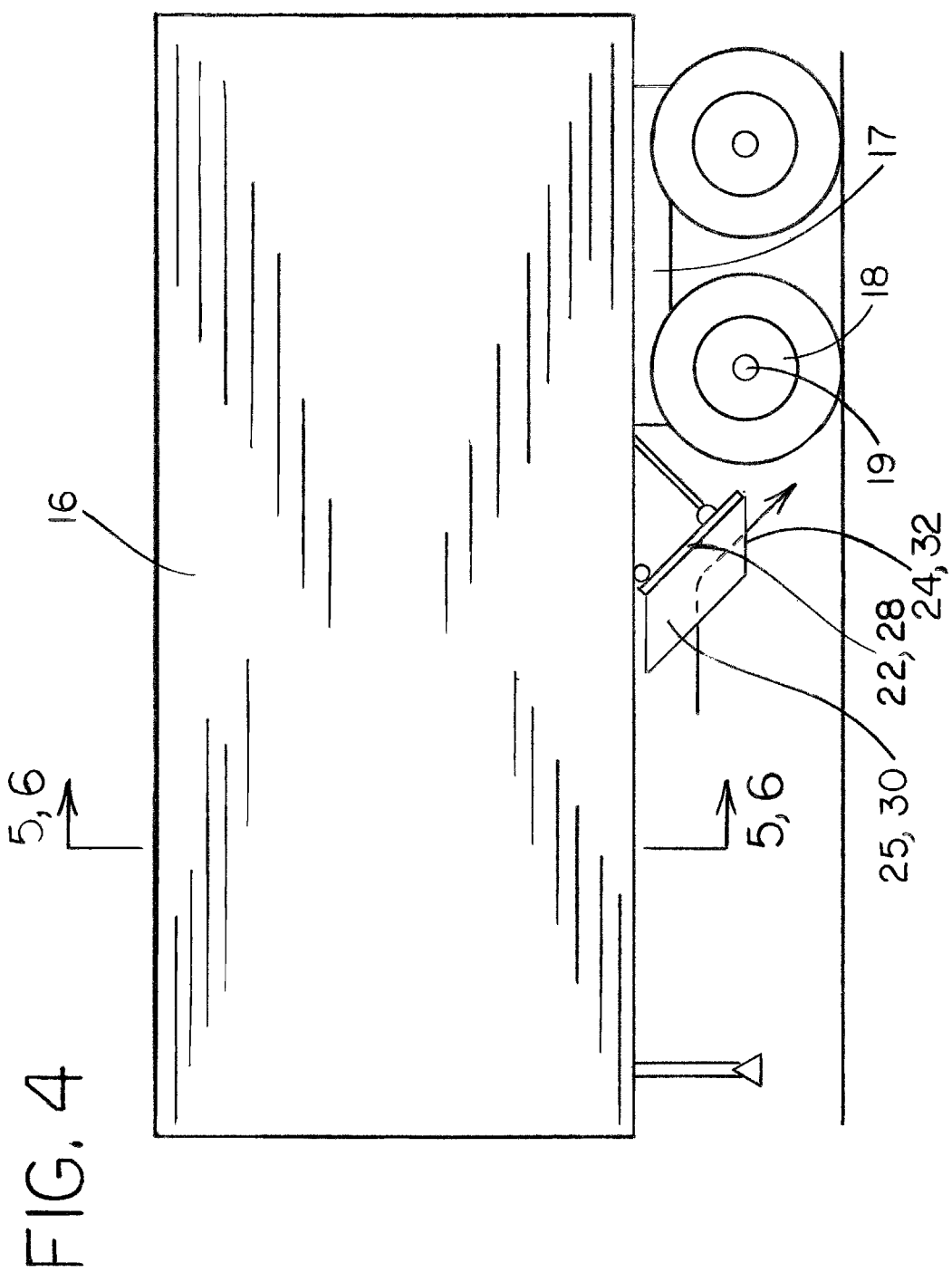
In FIG. 4, a channeled aerodynamic deflector panel assembly is mounted underneath the trailer of an industrial truck in front of the rear wheel assembly.
Figure 5:
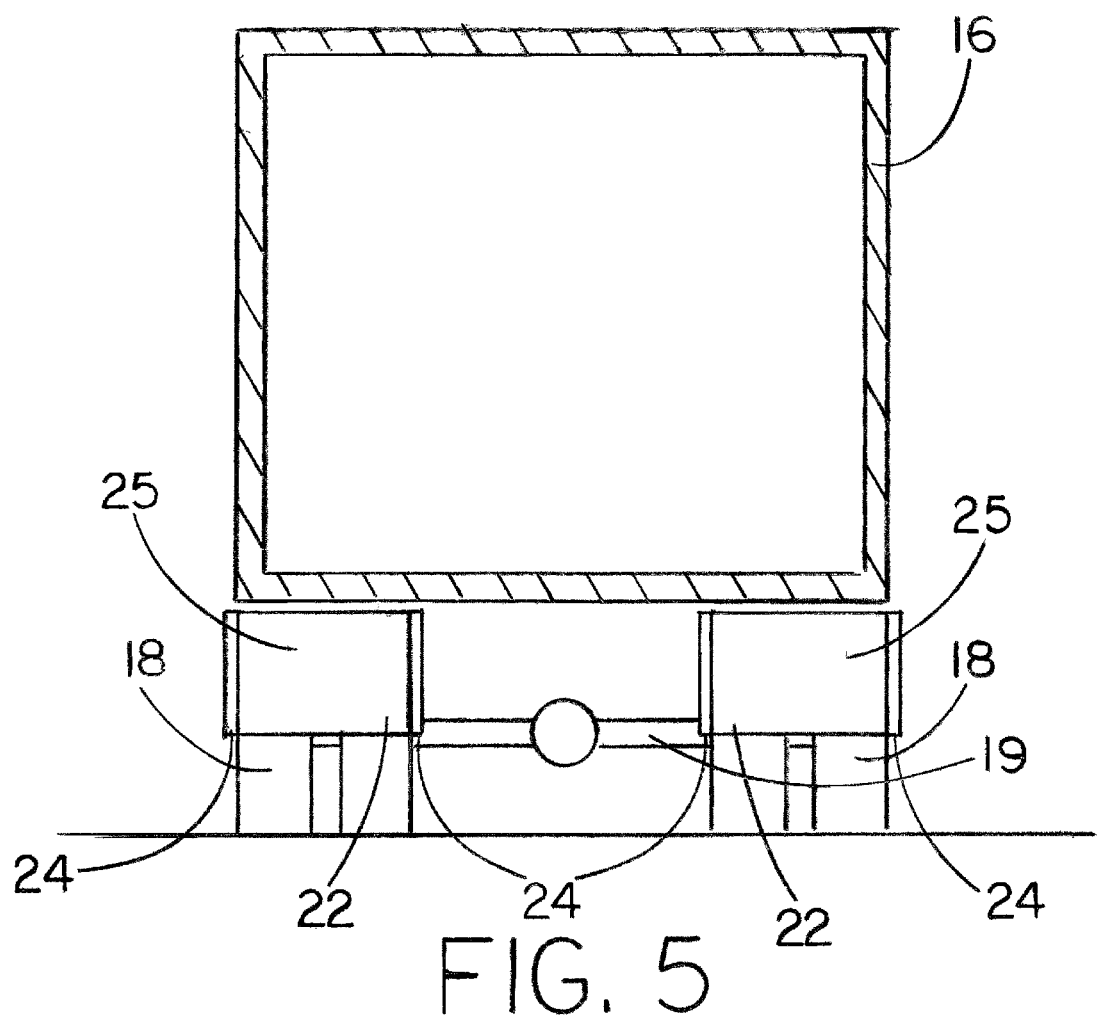
In FIG. 5, the channeled aerodynamic wheel deflector panel assembly of FIG. 4 is shown mounted on the trailer as viewed in cross-section from the front of the vehicle. Two deflector panel assemblies are shown, each as mounted in front of one of the wheel sets of the rear wheel assembly.

Third Embodiment—FIGS. 4 and 5

As shown in FIGS. 4 and 5, an embodiment comprises a channeled aerodynamic wheel deflector panel assembly 25 attached to and mounted underneath the body of a trailer 16 for a commercial vehicle. The channeled wheel deflector panel assembly 25 is located forward of the rear wheel assembly 17 and located directly in front of a trailing wheel set 18 which would otherwise be exposed to headwinds when the vehicle is in forward motion. The channeled wheel deflector panel assembly 25 includes a deflector plate 22 which is generally planar in shape, mounted inclined in a forwardly-angled orientation with the upper edge more forwardly-located and the lower surface located more rearward on the vehicle. The channeled wheel deflector panel assembly 25 includes forwardly-projecting end plates 24 attached to either side edge of the deflector plate 22, forming a channeled deflector panel assembly 25 to funnel headwinds directly onto the lower wheel surfaces, minimizing any outwardly deflected headwind from otherwise impinging on the trailing upper wheel surfaces.

The channeled wheel deflector panel assembly 25 ideally extends downward to no lower than the level of the axle 19 and is located proximal to the trailing wheel set 18 in order to deflect and funnel headwinds onto the exposed lower wheel surfaces, thereby reducing overall vehicle drag and improving propulsive efficiency.

Figure 6:
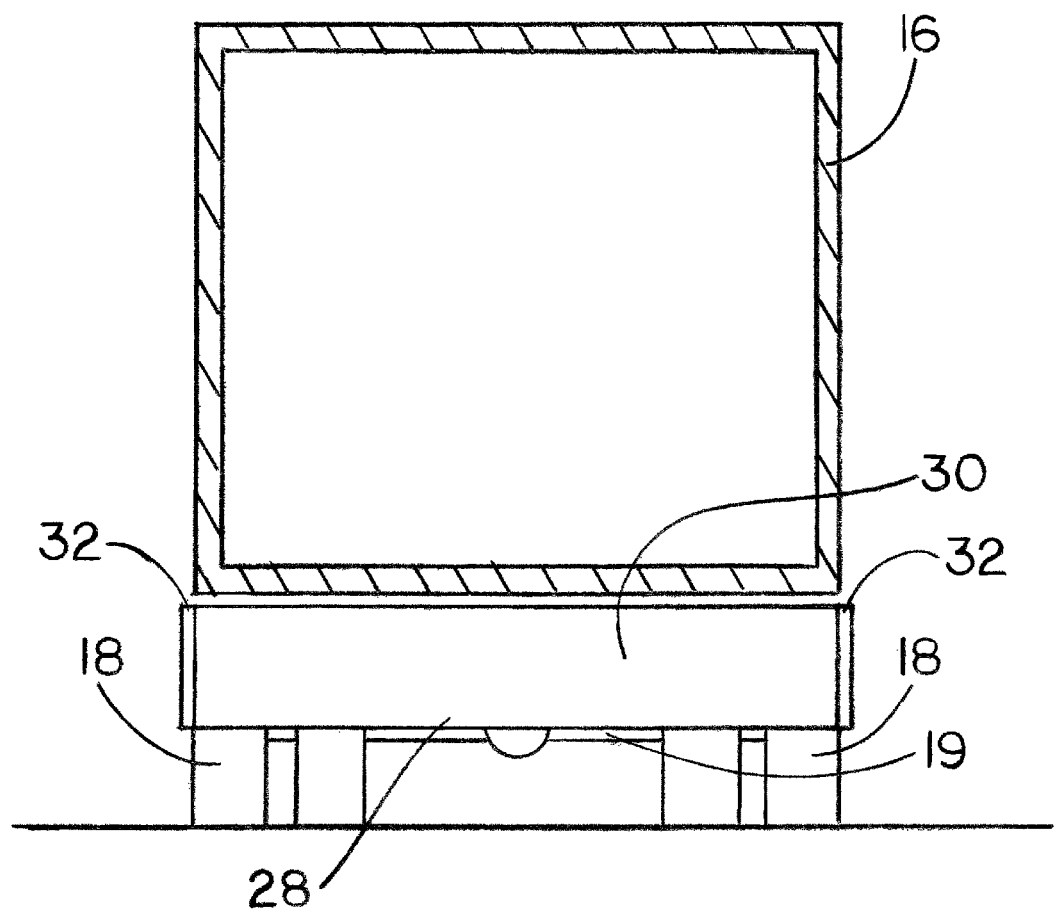
In FIG. 6, the channeled aerodynamic deflector panel assembly, which appears in side view similar to as shown in FIG. 4, is shown mounted on the trailer as viewed in cross-section from the front of the vehicle.

Fourth Embodiment—FIGS. 4 and 6

As shown in FIGS. 4 and 6, an embodiment comprises a channeled aerodynamic deflector panel assembly 30 attached to and mounted underneath the body of a trailer 16 for a commercial vehicle. The channeled deflector panel assembly 30 is located forward of the rear wheel assembly 17 and located in front of both trailing wheel sets 18 which would otherwise be exposed to headwinds when the vehicle is in forward motion. The channeled deflector panel assembly 30 includes a deflector plate 28 which is generally planar in shape, mounted inclined in a forwardly-angled orientation with the upper edge more forwardly-located and the lower surface located more rearward on the vehicle. The deflector plate 28 spans the lateral width of the trailer 16, and where directly aligned in front of the wheels ideally extends downward to no lower than the level of the axle 19. The channeled deflector panel assembly 30 includes forwardly-projecting end plates 32 attached to either side edge of the deflector plate 28, forming a channeled deflector panel assembly 30 to funnel headwinds directly onto the lower wheel surfaces and minimize any outwardly deflected headwind from otherwise impinging on the trailing upper wheel surfaces. Although not shown, between the wheel sets 18, the deflector plate 28 may extend further downward to deflect headwinds well below the central axle assembly 19.

The channeled deflector panel assembly 30 is located proximal to the trailing wheel set 18 in order to deflect headwinds onto the exposed lower wheel surfaces, and to deflect headwinds from directly impinging on the central axle assembly 19, thereby reducing overall vehicle drag and improving propulsive efficiency.

Figure 7:
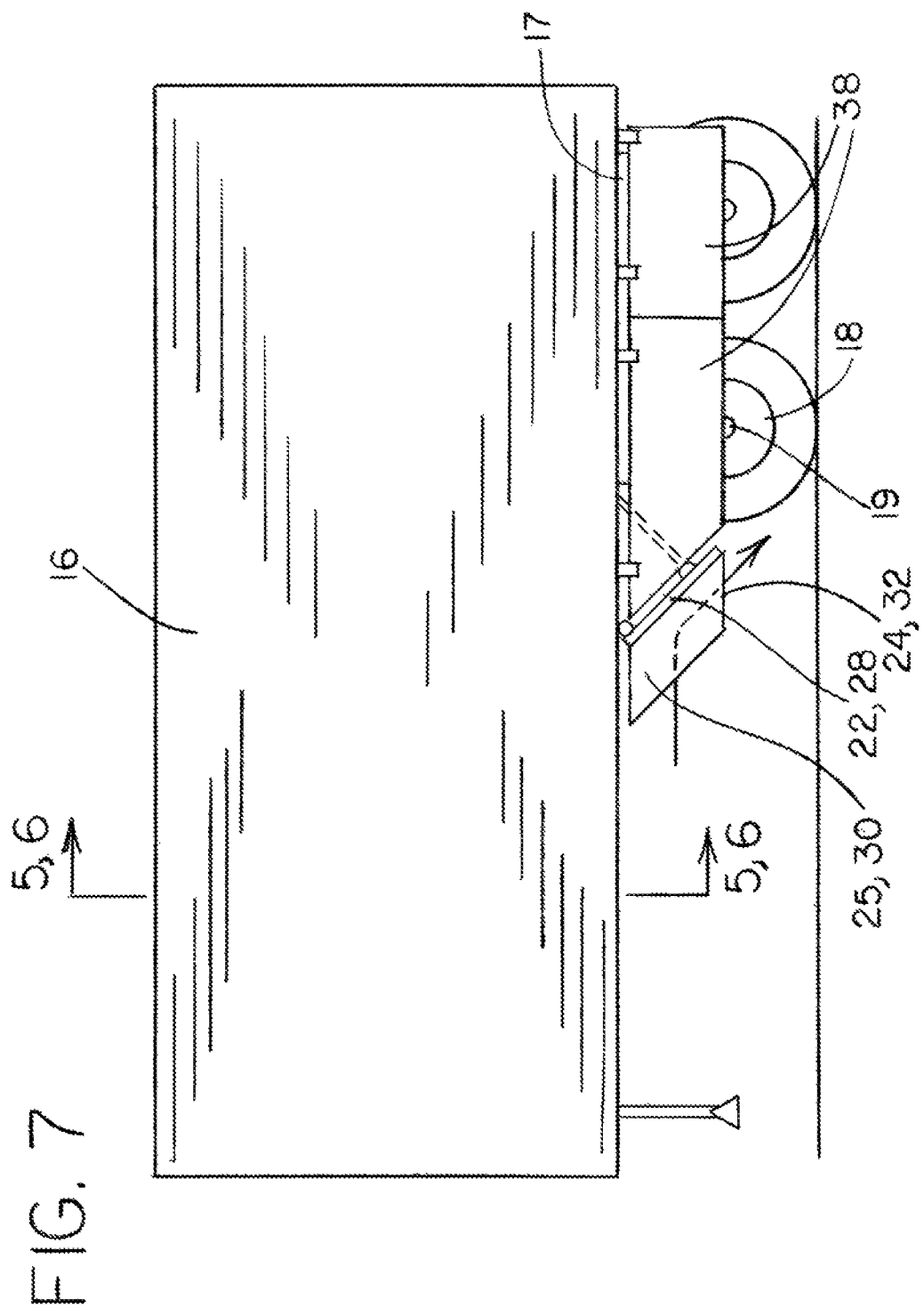
In FIG. 7, a channeled aerodynamic deflector panel and wheel skirt assembly is mounted underneath the trailer of an industrial truck in front of a wheel set of the rear wheel assembly.

Fifth Embodiment—FIGS. 7 and 5

As shown in FIG. 7 in side view, and as shown in FIG. 5 when viewed in cross-section from the front of the vehicle, an embodiment comprises the channeled aerodynamic wheel deflector panel assembly 25 identical to that of the third embodiment above, together with removable upper wheel skirt panels 38 covering the outside of the trailing wheel sets 18. The upper wheel skirt panels 38 also ideally extend downward to no lower than the level of the axle 19.

The upper wheel skirt panels 38 extend from the deflector plate 22 rearward to cover adjacent trailing wheel sets 18, thereby shielding the trailing upper wheels from external headwinds. The channeled wheel deflector panel assembly 25 used in combination with the upper wheel skirt panels 38 reduces overall vehicle drag and improves propulsive efficiency.

Sixth Embodiment—FIGS. 7 and 6

As shown in FIG. 7 in side view, and as shown in FIG. 6 when viewed in cross-section from the front of the vehicle, an embodiment comprises the channeled aerodynamic deflector panel assembly 30 identical to that of the fourth embodiment above, together with removable upper wheel skirt panels 38 covering the outside of the trailing wheel sets 18. The upper wheel skirt panels 38 also ideally extend downward to no lower than the level of the axle 19.

The upper wheel skirt panels 38 extend from the deflector plate 28 rearward to cover adjacent trailing wheel sets 18, thereby shielding the trailing upper wheels from external headwinds. The channeled deflector panel assembly 30 used in combination with the upper wheel skirt panels 38 reduces overall vehicle drag and improves propulsive efficiency.

Figure 8:
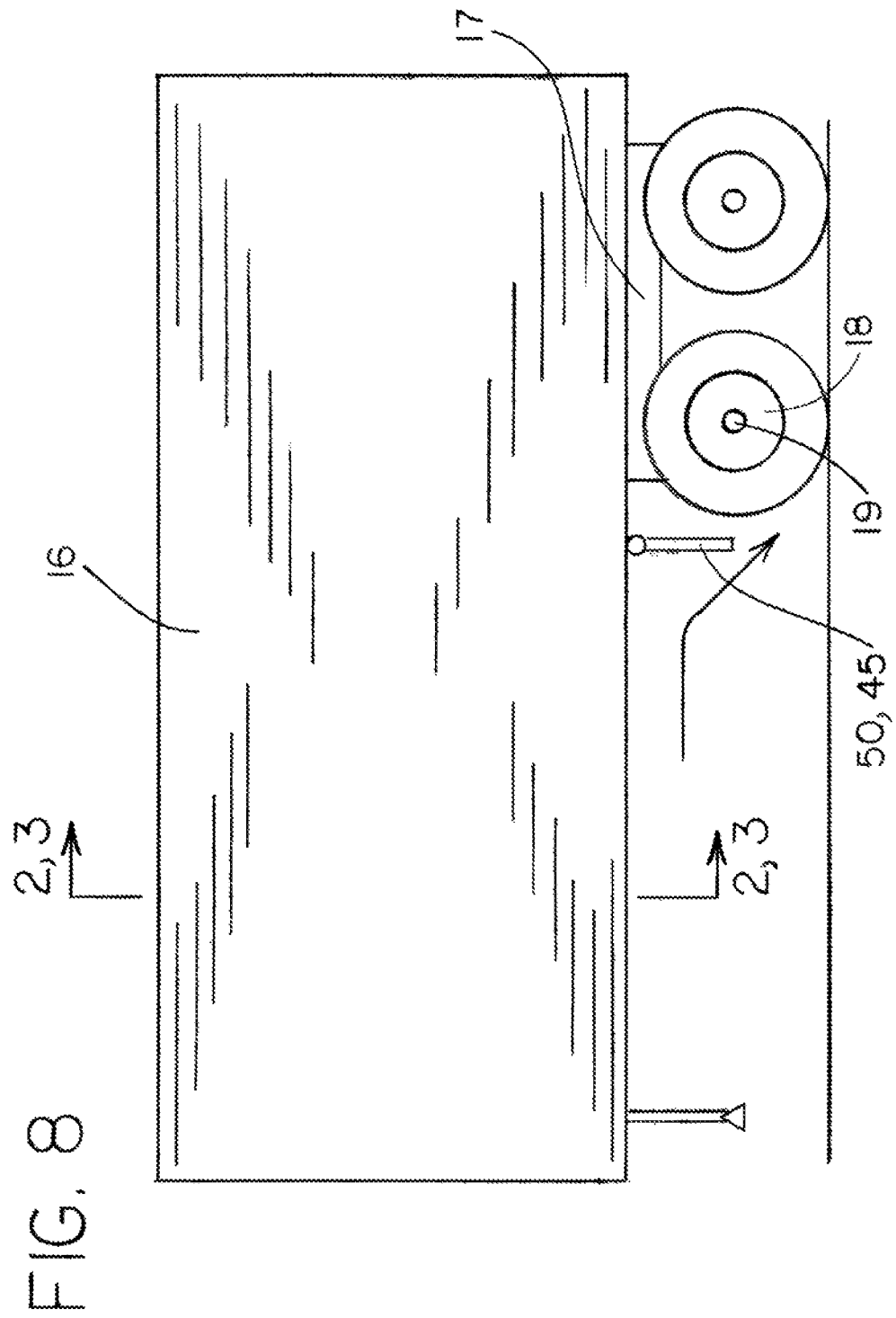
In FIG. 8, an aerodynamic wheel deflector panel is mounted underneath the trailer of an industrial truck in front of a wheel set of the rear wheel assembly.

Seventh Embodiment—FIGS. 8 and 2

As shown in FIG. 8 in side view, and as shown in FIG. 2 when viewed in cross-section from the front of the vehicle, an embodiment comprises an aerodynamic wheel deflector panel 45 is attached to and mounted underneath the body of a trailer 16 for a commercial vehicle. The wheel deflector panel 45 is located forward of the rear wheel assembly 17 and located in front of a trailing wheel set 18, which would otherwise be exposed to headwinds when the vehicle is in forward motion. The wheel deflector panel 45 is planar in shape, sufficiently wide to deflect headwinds from directly impinging on the upper wheels of the trailing wheel set, mounted vertically and shown oriented parallel to the axle 19. The wheel deflector panel 45 ideally extends downward no lower than the level of the axle 19, and is located proximal to the trailing wheel set 18 in order to deflect headwinds substantially toward either the outside or the inside of the wheel set 18, or onto the lower wheel surfaces—thereby reducing overall vehicle drag and improving propulsive efficiency.

This simple wheel deflector panel configuration is appropriate for use when limited clearance space exists in front of the trailing wheel set.

Eighth Embodiment—FIGS. 8 and 3

As shown in FIG. 8 in side view, and as shown in FIG. 3 when viewed in cross-section from the front of the vehicle, an embodiment comprises an aerodynamic deflector panel 50 is attached to and mounted underneath the body of a trailer 16 for a commercial vehicle. The deflector panel 50 is located forward of the rear wheel assembly 17 and located in front of a trailing wheel sets 18 which would otherwise be exposed to headwinds when the vehicle is in forward motion. The deflector panel 50 is planar in shape, spans the lateral width of the trailer 16, and where aligned directly in front of the wheel sets 18 ideally extends downward to no lower than the level of the axle 19. The deflector panel 50 is mounted vertically and parallel to the axle 19. The deflector panel 50 is located proximal to the trailing wheel sets 18 in order to deflect headwinds substantially toward either the outside of the trailing upper wheels, under the central axle assembly, or onto the lower wheel surfaces—thereby reducing overall vehicle drag and improving propulsive efficiency.

This simple deflector panel configuration is appropriate for use when limited clearance space exists in front of the trailing wheel assembly.

Figure 9:
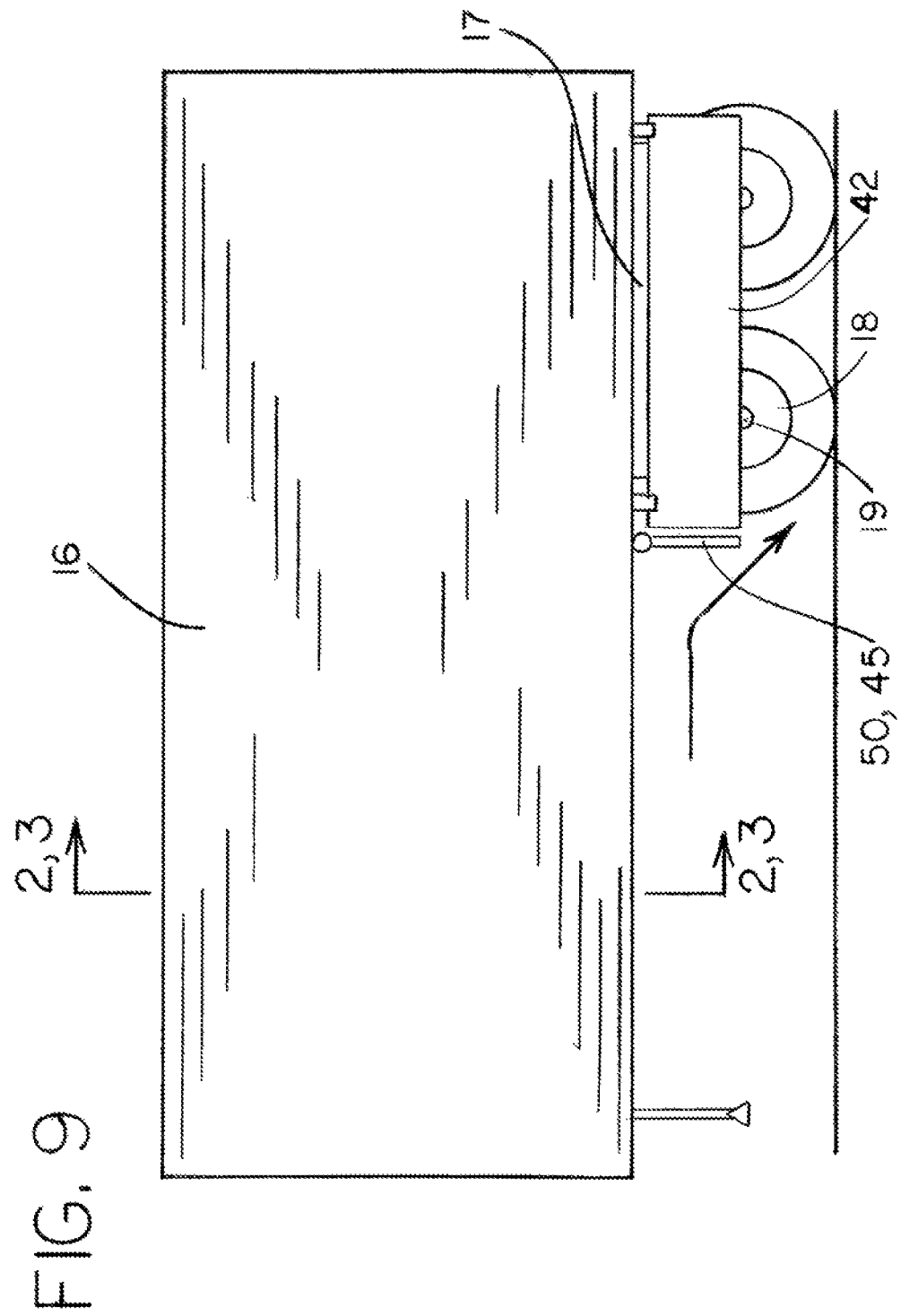
In FIG. 9, an aerodynamic deflector panel and wheel skirt assembly is mounted underneath the trailer of an industrial truck in front of the rear wheel assembly.

Ninth Embodiment—FIGS. 9 and 2

As shown in FIG. 9 in side view, and similar to as shown in FIG. 2 when viewed in cross-section from the front of the vehicle, an embodiment comprises the aerodynamic wheel deflector panel 45 identical to that of the seventh embodiment above, together with removable upper wheel skirt panels 42 covering the outside of the trailing wheel sets 18. The upper wheel skirt panels 42 also ideally extend downward to no lower than the level of the axle 19.

The upper wheel skirt panels 42 extend from the deflector panel 45 rearward to cover adjacent trailing wheel sets 18, thereby shielding the trailing upper wheels from external headwinds. The wheel deflector panel 45 used in combination with the upper wheel skirt panels 42 reduces overall vehicle drag and improves propulsive efficiency.

This simple wheel deflector panel configuration is appropriate for use when limited clearance space exists in front of the wheel sets and where the use of exterior wheel skirts panels is permitted.

Tenth Embodiment—FIGS. 9 and 3

As shown in FIG. 9 in side view, and similar to as shown in FIG. 3 when viewed in cross-section from the front of the vehicle, an embodiment comprises the aerodynamic wheel deflector panel 50 identical to that of the eighth embodiment above, together with removable upper wheel skirt panels 42 as used in the ninth embodiment above. The deflector panel 50 used in combination with the upper wheel skirt panels 42 reduces overall vehicle drag and improves propulsive efficiency.

This simple wheel deflector panel configuration is appropriate for use when limited clearance space exists in front of the wheel sets, where deflecting headwinds from directly impinging on the central axle assembly 19 is needed, and where the use of exterior wheel skirts panels is permitted.

Figure 10:
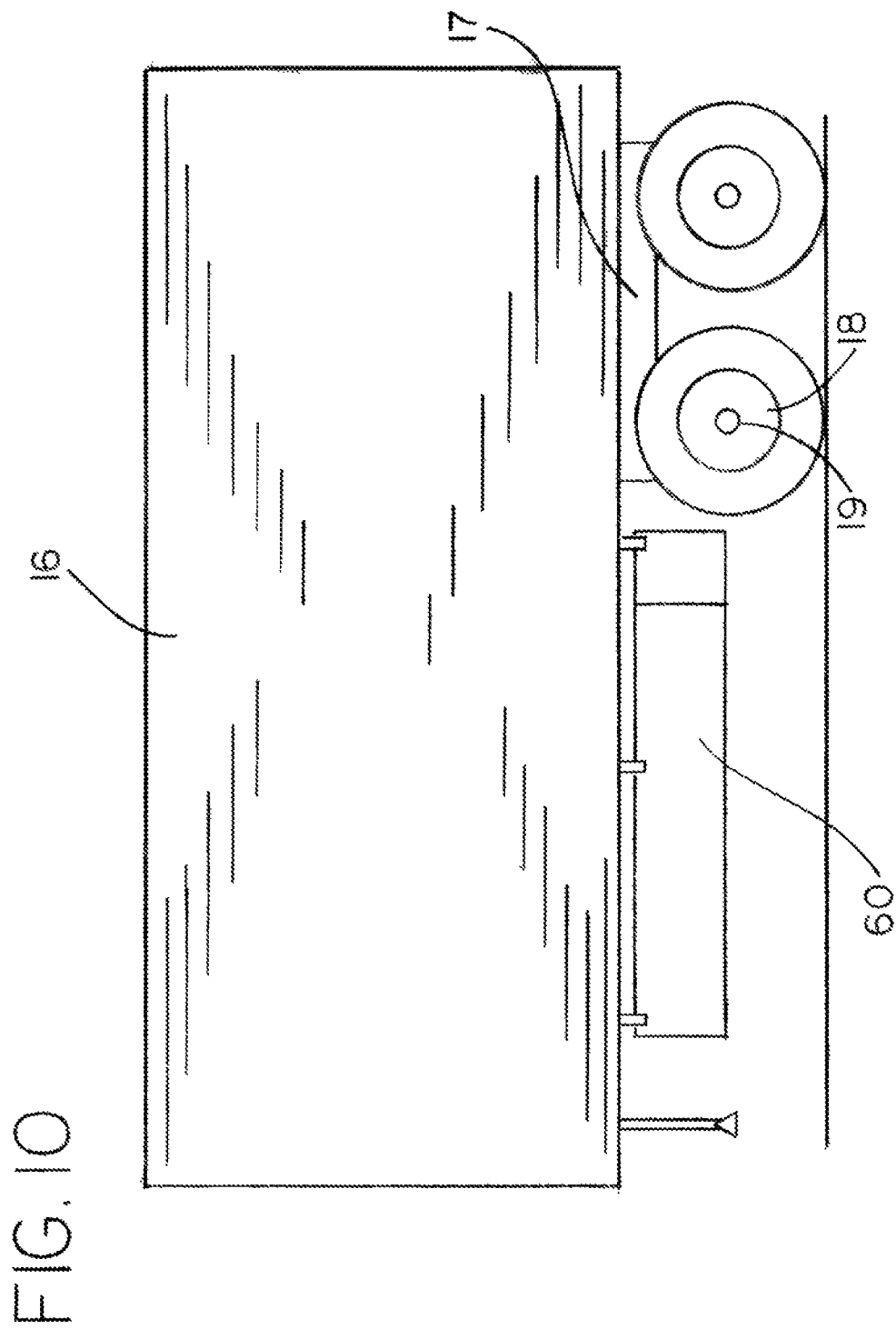
In FIG. 10, an aerodynamic deflector skirt assembly is mounted underneath the trailer of an industrial truck in front of the rear wheel assembly.

Eleventh Embodiment—FIGS. 10 and 11

As shown in FIGS. 10 and 11, an embodiment comprises an aerodynamic vehicle skirt assembly 60 is attached to and mounted underneath the body of a trailer 16 for a commercial vehicle. The vehicle skirt assembly 60 is located forward of the rear wheel assembly 17 which would otherwise be exposed to headwinds when the vehicle is in forward motion. The vehicle skirt assembly 60 ideally extends downward to no lower than the level of the axle 19 of the trailing wheel set 18, leaving lower wheel surfaces of the trailing wheel set 18 exposed to headwinds.

The vehicle skirt assembly 60 is shown mounted to the trailer 16 with the forwardmost end of the vehicle skirt assembly 60 inset toward the centerline of the trailer 16 to a position in general longitudinal alignment with the inside of—and thereby substantially in front of—the innermost surface of the trailing wheel set 18. Extending rearward, the vehicle skirt assembly 60 progressively varies in position toward the outside of the body of the trailer 16, extending more rapidly toward the outside wheel when nearest the rear end, which is located proximate to the trailing wheel set 18. The rear end of the vehicle skirt assembly 60 is located near the outer side of the wheel set 18, thereby deflecting headwinds substantially toward the outside of the upper wheel surfaces and below onto the lower wheel surfaces.

The vehicle skirt assembly 60 may be constructed from either a single panel or from multiple panels arranged end-to-end. The vehicle skirt assembly 60 may be constructed with resilient materials, especially along the lower edge that may occasionally contact road obstacles. The vehicle skirt assembly 60 may also be mounted to the trailer 16 by deflectable resilient means, returning the vehicle skirt assembly 60 to the proper aerodynamic position after contacting road obstacles.

Figure 12:
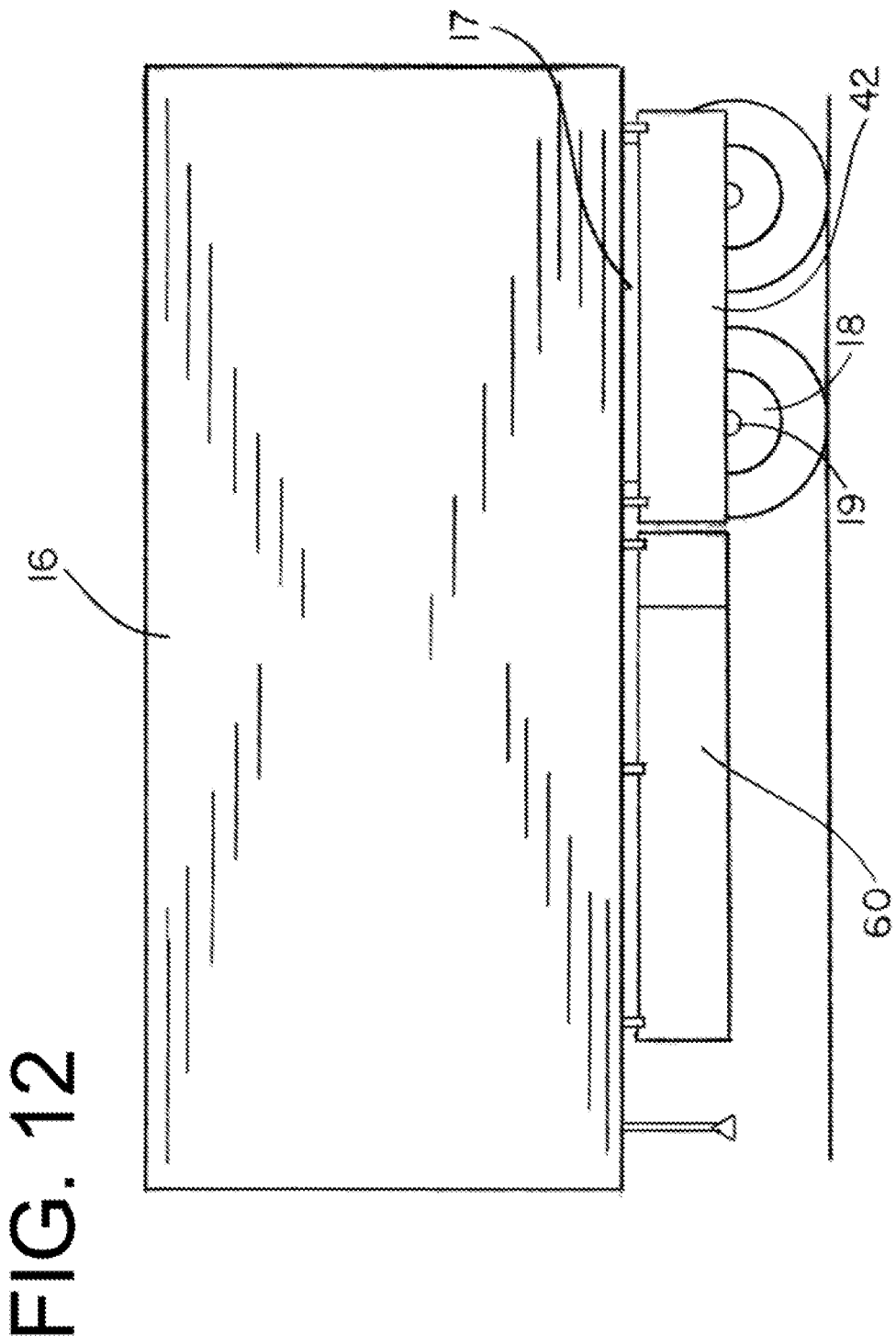
In FIG. 12, the aerodynamic deflector skirt assembly together with a wheel skirt panel assembly is mounted to the trailer of an industrial truck.

Twelfth Embodiment—FIG. 12

As shown in FIG. 12, an embodiment comprises the aerodynamic vehicle skirt assembly 60 identical to that of the eleventh embodiment above, together with removable upper wheel skirt panels 42 covering the outside of the trailing wheel sets 18 as used in the tenth embodiment above.

The upper wheel skirt panels 42 extend from the aerodynamic vehicle skirt assembly 60 rearward to cover adjacent trailing wheel sets 18, thereby ideally shielding the trailing upper wheel surfaces from external headwinds. The aerodynamic vehicle skirt assembly 60 used in combination with the upper wheel skirt panels 42 reduces overall vehicle drag and improves propulsive efficiency.

Figure 20:
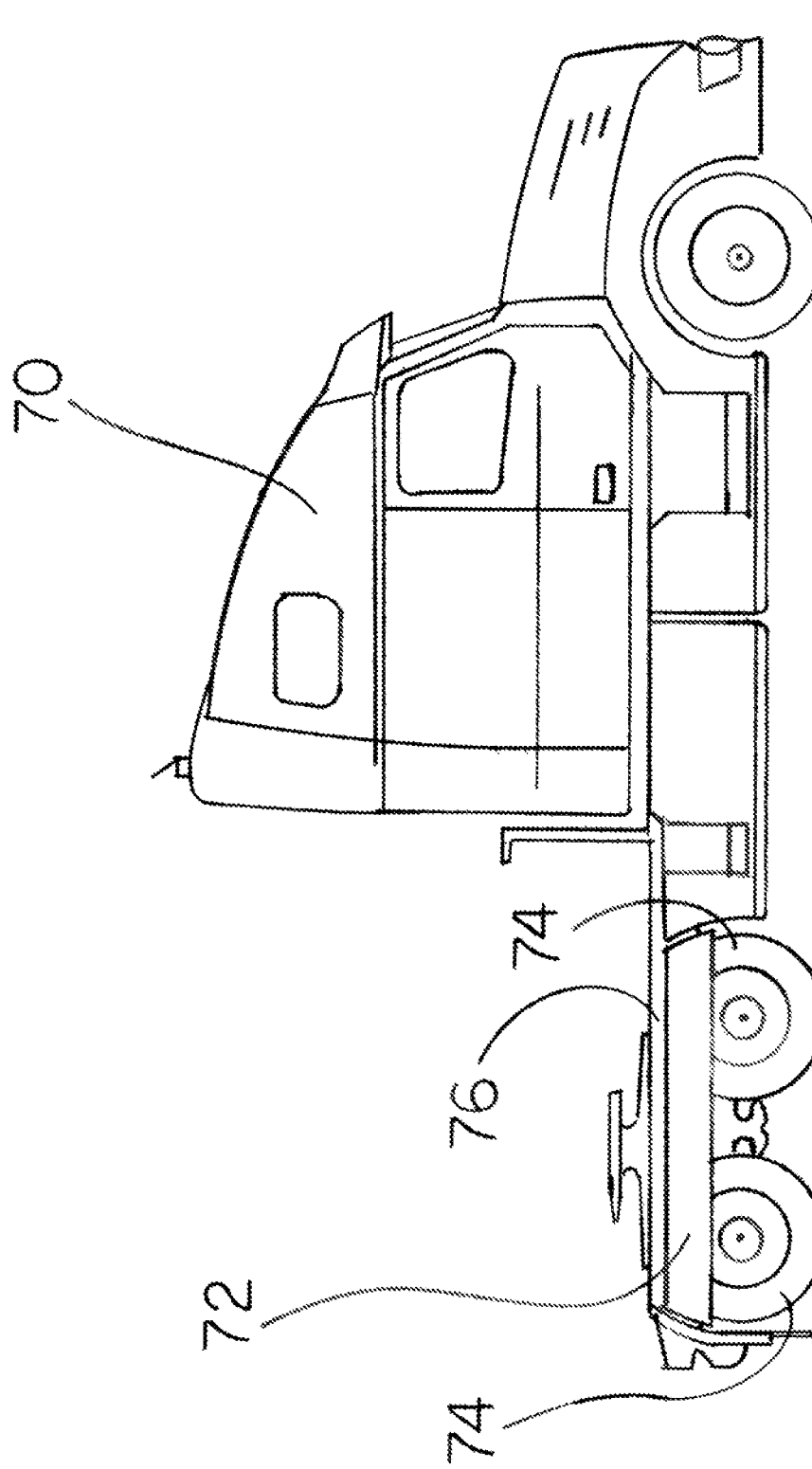
In FIG. 20, an aerodynamic wheel skirt panel 72 is shown attached the frame of a semi truck tractor. The wheel skirt panel is disposed to shield upper tire sidewalls of the rearward wheels of the truck tractor from headwinds otherwise impinging thereon.

Thirteenth Embodiment—FIG. 20

As shown in FIG. 20, an embodiment comprises an aerodynamic wheel skirt panel 72 disposed adjacent to an upper sidewall of a tire of a rearward wheel assembly 74 of a semi truck tractor 70. The skirt panel 72 is attached to the vehicle frame 76 and arranged to shield the upper tire sidewall from being otherwise exposed to headwinds, thereby reducing overall vehicle drag and improving vehicle propulsive efficiency. While the tractor is shown with dual wheel assemblies 74, the skirt panel could also be utilized on a tractor having only a single rearward wheel assembly.

Fourteenth Embodiment—FIGS. 21-26

As shown in FIGS. 21 and 22, an embodiment comprises an inwardly slanting aerodynamic trailer skirt 90 disposed underneath the body of a semitrailer 80. The slanted trailer skirt 90 is disposed from a forwardmost end thereof located largely adjacent to an outer lateral side of the trailer body toward a rearmost end thereof located substantially inboard therefrom toward the longitudinal centerline of the semitrailer 80. The rearmost end is preferably located no further distant from the longitudinal centerline than the lateral position of the innermost lateral sidewall of a tire of the trailing wheel set 82. The forwardmost end of the slanted trailer skirt 90 may be disposed proximate to the vehicle landing gear 84, while the rearmost end may be disposed rearward therefrom positioned proximate to the longitudinal centerline of the semitrailer 80.

Figure 23:
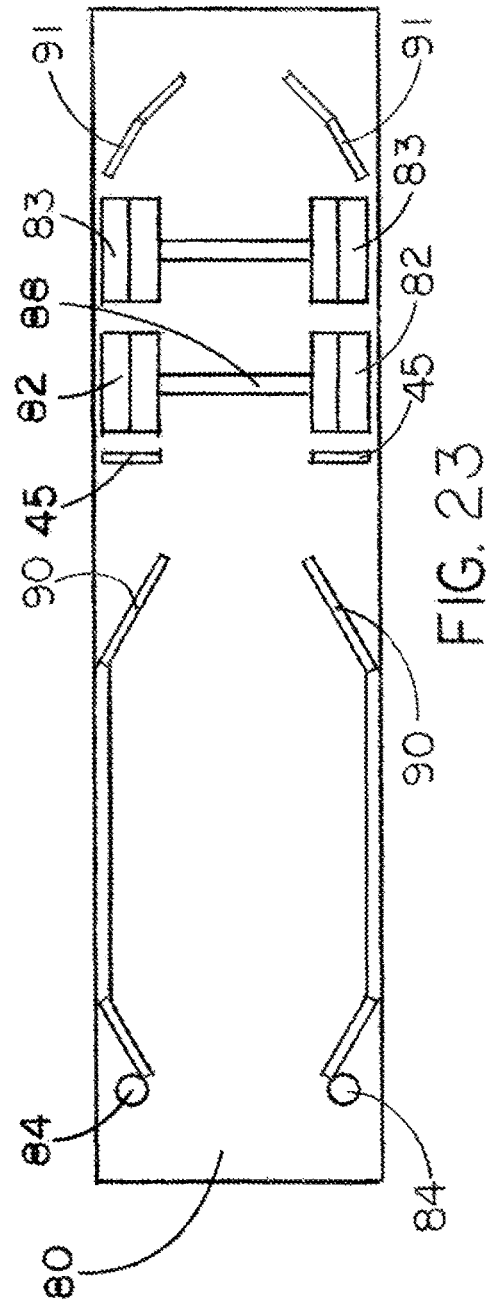
In FIG. 23, an inwardly slanting aerodynamic trailer skirt 90 is shown disposed underneath a semitrailer, extending first alongside the lateral sides of the trailer from near the landing gear 84 before slanting laterally inwards to near the rearward wheel assembly. The slanted trailer skirt is shown used in combination with an aerodynamic wheel deflector panel 45 and with an inwardly slanting sectioned trailer skirt 91 disposed underneath the rearmost portion of a semitrailer.
Figure 24:
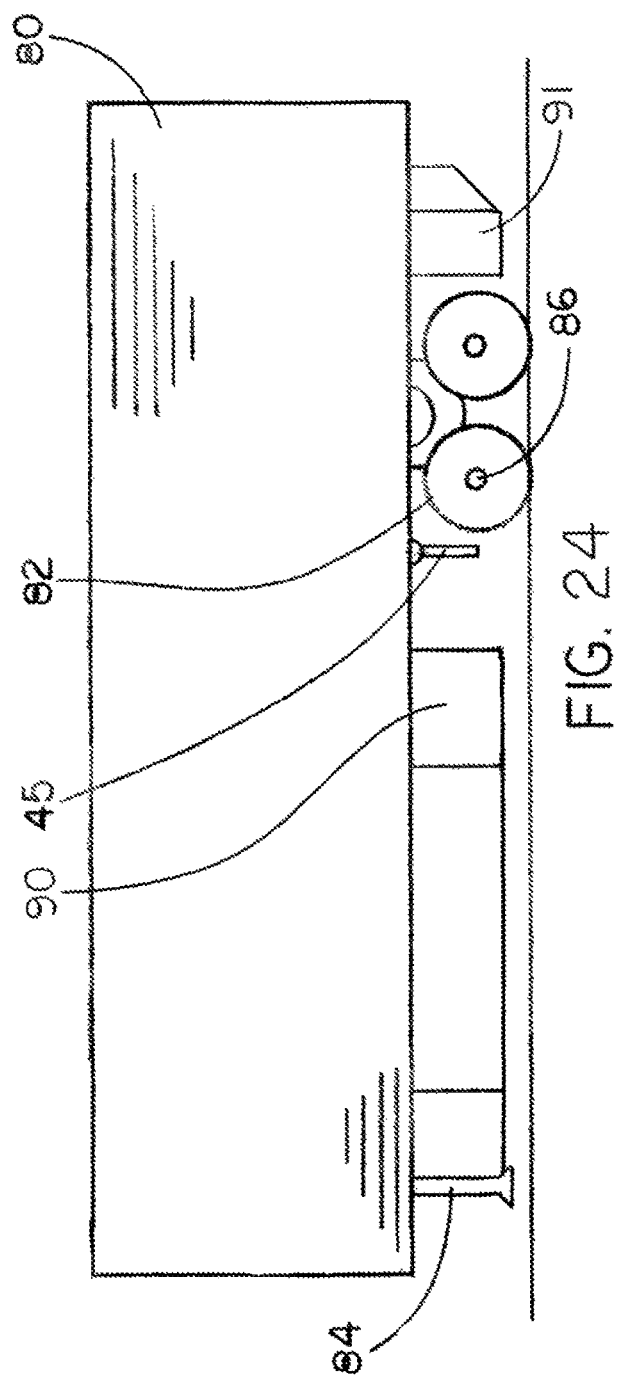
In FIG. 24, the inwardly slanting aerodynamic trailer skirts of FIG. 23 are shown in side view disposed underneath a semitrailer.

In another configuration of the present embodiment as shown in FIGS. 23 and 24, the forwardmost end of the inwardly slanted portion of the slanted trailer skirt 90 may be disposed substantially rearward of the vehicle landing gear 84, while the rearmost end may be aligned directly in front of a portion of the central axle assembly 88, and thereby be positioned just inside the inner sidewall of the trailing wheel 82. As further shown FIGS. 23 and 24, additional forward portions of the slanted trailer skirt 90 may be disposed alongside the outer lateral sides of the body of the semitrailer 80.

In still another configuration of the present embodiment as shown in FIGS. 25 and 26, the inwardly slanted portion of the slanted trailer skirt 90 may be arranged to be substantially curved inward in a smooth aerodynamic disposition, such as that forming one side of a tail fin, or alternatively such as an upper or lower surface of an airplane wing. Such a curved arrangement may further decrease drag on the vehicle. And as shown, the forward section disposed ahead of the slanted portion of the slanted trailer skirt 90 may also include an inwardly directed forwardmost portion thereof that so disposed, further decreases vehicle drag by shaping the full length of the trailer skirt to more closely resemble the aerodynamic profile of an airplane wing.

And from these examples, it can be appreciated that a range of alternatives for the present embodiment all incorporating the same general configuration can be envisioned therefrom, where the locations of the forwardmost and rearmost ends can be combined in various ways wherein all such configurations include the forwardmost end being located laterally substantially outboard from the rearmost end of the slanted trailer skirt 90.

And from these configurations, it can be further appreciated that a range of alternatives for the present embodiment all incorporating the same general configuration can be envisioned therefrom, where the forwardmost end of the slanted panels may be located substantially rearward from where shown, and where the rearmost end of the slanted panels may be located substantially forward or rearward of where shown.

The particular locations of the forwardmost and rearmost ends of the slanted trailer skirt 90 will depend largely upon the intended operating configuration of the trailer 80. While the slanted trailer skirt 90 may be employed as the lone aerodynamic enhancement device disposed on the trailer providing vehicle drag reduction, this configuration would leave the critical vehicle-drag-inducing upper wheel surfaces exposed to headwinds. Thus, it is expected that this embodiment will often be deployed in combination with other aerodynamic devices that substantially shield the upper wheels of the trailing wheel set from headwinds, such as the wheel deflector panel 45 as shown in FIGS. 21-26.

In operation, the present embodiment induces headwinds to flow largely alongside panels of the slanted trailer skirt 90, and to be directed substantially inward and rearward underneath the trailer body, and to thereby flow largely in-between the wheel sets of the trailing axle assembly. While the central portion of trailing axle 88 itself may induce substantial drag on the trailer, if sufficient amounts of air are diverted to flow in-between the wheel sets, an overall reduction in vehicle drag can be achieved. For this reason, the exposed central axle 88 is preferably arranged substantially unshielded and fully-exposed to headwinds for maximum flow of air therearound.

Indeed, by redirecting substantial airflow in-between the wheel sets of the trailing axle assembly, an increase in static air pressure can be produced in the region located immediately behind the trailer body. The increased air pressure in this trailing region then acts directly on the rear-facing surfaces—such as the rear doors—of the trailer body, to thereby reduce the net pressure drag being developed on the tractor-trailer, between the forward-facing front surfaces thereof—which are exposed to headwinds—and the naturally shielded rear-facing surfaces at the back of the trailer.

If a sufficient increase in air pressure is produced in this trailing region located immediately behind the trailer, then the consequent reduction in pressure drag on the trailer body itself can more than offset any increased drag on the central axle assembly from increased airflow in-between the wheel sets. This operating condition then yields a method for determining the proper configuration of the present embodiment that yields a reduction in overall vehicle drag; that the slanted trailer skirt be so arranged in limited extended drag-inducing disposition while increasing air pressure or airflow in-between the wheel sets to provide an overall reduction in vehicle drag.

The present embodiment then induces air to flow laterally inward—rather than compressing air specifically downward below the level of the axle 86 close to the ground—as the passing vehicle moves forward. The displaced air flows generally laterally inward, sliding largely along relatively smooth aerodynamic panels of the slanted trailer skirt 90 toward the generally exposed central axle 88, thereby minimizing any frictional drag induced thereon.

The slanted trailer skirt 90 may then function in a manner similar to that of a tail fin of an airplane, where displaced air remains largely laminar as it slides alongside the smoothly curved surfaces of the forward-moving tail fin. On the trailer then, the central axle 88 preferably remains largely exposed to headwinds, permitting maximum flow of relatively static laminar air in-between the wheel sets to substantially reduce pressure drag on the vehicle.

Using the slanted trailer skirt 90, the air being displaced by the passing vehicle is similarly motivated—as in a streamlined tail fin—to move naturally inward toward the vehicle centerline, simply from the action of static atmospheric pressure. Static air pressure causes the passing void—created under the trailer by the tractor displacing air forward of the forward moving vehicle—to be filled in immediately by air flowing laterally inward generally from around the sides of the trailer, thereby causing air to flow largely alongside the panels of the slanted trailer skirt 90 as the vehicle moves forward.

In this way, the slanted trailer skirt 90 actually induces air to be directed inward in a smooth manner toward the vehicle centerline, leaving the trailing wheels 82 exposed to headwinds. For this reason, the present embodiment is often employed in conjunction with a wheel shielding device—such as the wheel deflector panel 45—diverting air from impinging upon the otherwise exposed trailing upper wheel surfaces. Otherwise, any gain in vehicle drag-reduction achieved by the present embodiment will be partially offset by headwinds directed against the critical vehicle-drag-inducing upper wheel surfaces.

For this reason, the potential of the present embodiment for reducing overall vehicle drag has gone unappreciated in the art, since this configuration naturally exposes the wheels to headwinds, a condition for reducing vehicle drag that is largely contrary to the general understanding in the prior art—that the wheels must instead be substantially shielded from headwinds for reduced overall drag on the vehicle.

In addition, the V-shaped configuration shown in FIGS. 21-26 of the slanted trailer skirts 90 being disposed on both sides of the semitrailer 80—thereby acting in combination thereof as a streamlined tail fin—provides a natural reduction in effective pressure drag being developed by the tractor of the tractor-trailer combination. That is, the streamlining provided the combined dual slanted trailer skirts 90 adds in part an effective natural tail fin arrangement to the connected tractor itself, thereby reducing any pressure drag directed thereon in a manner similar to that of the streamlined tail fin on an airplane.

The tail fin configuration of the combined dual slanted trailer skirts 90 may or may not include the rearmost ends thereof being themselves disposed in proximal adjacency. In one configuration, the trailing ends of the combined dual slanted trailer skirts are located somewhat apart from the centerline of the vehicle body—as shown in FIG. 23—allowing air to flow relatively uninhibited from inside the rearward slanted V-shaped configuration toward the exposed central axle 88 of the trailing wheel assembly, minimizing any pressure drag from being developed on the slanted trailer skirts themselves.

And while the panels of the slanted trailer skirt 90 are generally shown as flat panels, as shown in FIGS. 21-24, the panels may instead be curved in order provide even more reduction in developed pressure drag on the tractor through additional streamlining, as shown in FIGS. 25 and 26. For example, the skirt panels could be curved similar to that of an upper or lower surface of an airplane wing—as mentioned above—in order provide further reduction in drag induced on the vehicle. Such an improved aerodynamic arrangement may include shaping a portion of the rearward slanted portion of the trailer skirt 90 in the general form of the graph of a cubic parabola (where the curved portion of the slanted portion of the trailer skirt 90 is in the general shape of a graph of a polynomial of degree three: $y=ax3+bx2+cx+d$, with $a \neq 0$, where the curve is non-divergent and substantially symmetric with respect to the midpoint thereof, where $x=-b/3a$), as shown in FIG. 25. Such a complex transition-shaped curve can provide additional streamlining over the simple slanted trailer skirt 90, by further reducing drag on both surfaces positioned either to the inside or to the outside of the rearward slanted portion of the trailer skirt 90.

Furthermore, as the slanted trailer skirt 90 is not arranged in order to substantially shield the upper wheels 82 of the trailing wheel 82 from headwinds, the particular elevation of the skirt disposed above the ground is not determined in relation to that needed to shield the trailing upper wheel surfaces. Instead, the height of the slanted trailer skirt above the ground is determined in relation to the effectiveness of the skirt in redirecting air to flow in-between the trailing wheel sets on either side of the vehicle, while not inducing too much additional drag on the slanted trailer skirt itself.

And the height above the ground of the slanted trailer skirt 90 may vary along the length thereof, consistent with that needed to achieve the aforementioned functional requirement, while being deployed either alone or in combination with an upper wheel shielding device, or with other devices further diverting air to flow largely in-between the trailing wheel sets.

For example, a configuration may include the slanted trailer skirts 90 being disposed in combination with minimal elevation above the ground nearest the forwardmost ends thereof, and with increasing elevation toward the rearmost ends thereof. In some configurations, this could provide greater ground obstacle clearance for the skirt panels located near the longitudinal centerline of the trailer, while still inducing substantial air located nearest the outer lateral sides of the trailer to flow laterally inward toward the vehicle centerline, thereby increasing air-flow in-between the trailing wheel sets.

In another example, other air-directing devices may include supplemental laterally outer vehicle body side skirts 98—as shown in FIGS. 25 and 26—projecting a distance forward from the trailing wheel sets and configured to further guide the inwardly flowing air in front of the central axle assembly to flow in-between the wheel sets. Alternatively, a forward deflector of an upper wheel shielding device used in conjunction with the slanted trailer skirt 90 may itself include an inwardly slanted forward deflector panel disposed to divert deflected air impinging thereon largely inward in front of the central axle assembly.

And another possible configuration of the present embodiment includes a substantial forwardmost portion of the slanted trailer skirt 90 being instead disposed largely along the outside lateral edge of the trailer body—as shown in FIGS. 23 and 24—with a rearmost portion of the skirt panel assembly then being disposed slanting inwards. When used in this V-shaped dual skirt arrangement, the effectively shortened V-shaped portion thereof may be employed in order to further accelerate lateral motion of the inwardly flowing air along the rearward portion of the slanted trailer skirt.

This longitudinally condensed slanted configuration could further reduce vehicle drag by having substantially reduced slanted panel length, with the slanted panels being located substantially close to the trailing wheel 82, thereby further increasing the rate of air flowing inward toward the front of the central axle 88 in order to further increase air flowing in-between the wheel sets and the consequent increase in air pressure developed behind the trailer itself. And the V-shaped portion of the slanted trailer skirt 90 could comprise either a series of short panels arranged end-to-end with each panel progressively slanted more inward toward the centerline, or with curved panels arranged consistent with the aerodynamic shape of a tail fin or wing.

Furthermore, while the slanted trailer skirt 90 are shown deployed in a generally vertical orientation, an alternative configuration may be preferred where the panels are tilted distinctly away from vertical, inclined with the lowermost portions thereof being disposed more laterally inward toward the vehicle centerline than the corresponding uppermost portions thereof. This inclined configuration of the panels would further induce a major portion of inwardly moving air to flow more downward toward the ground to be thereby directed largely under the central axle 88 of the trailing wheel assembly, further reducing drag thereon.

Finally, while the present embodiment is shown disposed ahead of the rearward wheel assembly of a semitrailer, where sufficient space exists behind the rearmost wheel assembly on the vehicle, a shortened version of the slanted trailer skirt 91 may instead be arranged behind the rearmost wheel assembly to further reduce drag on the vehicle. Slanted trailer skirt 91 shown in FIGS. 23 and 24 includes a series of flat panels disposed end-to-end and arranged at increasingly steep angles toward the rear of the trailer. And slanted trailer skirt 91 shown in FIGS. 25 and 26 includes a curved panel arranged in the general shape of a cubic parabola for further reduced drag on the vehicle.

As the space behind the rearmost wheel assembly is generally limited, and as the position of the trailer wheels often may be adjusted longitudinally substantially rearward to facilitate loading and unloading of heavy loads from the semitrailer, the longitudinal length of the slanted trailer skirt 91 must be generally more limited over the slanted trailer skirt 90, which is positioned ahead of the rearward wheel assembly. In order to minimize frictional drag induced thereon, the longitudinal length of the skirt 91 is preferably limited to that equal to no more than 150 percent of the diameter of the wheel assembly.

And as the function of the slanted trailer skirt 91 remains similar to that of the slanted trailer skirt 90 for inducing increased airflow rearward therefrom—while also reducing drag thereon—the slanted trailer skirt 91 is preferably disposed with the rear end thereof positioned substantially apart from the longitudinal centerline of the trailer body, while still extending across the full lateral width of the preceding drag-inducing wheel, thereby allowing air flowing from in-between the wheel sets to continue to flow rearward substantially unrestricted past the inside surface of the slanted trailer skirt 91.

While the slanted trailer skirt 91 has a restricted longitudinal length, other embodiments may include mounting the skirt 91 using an adjustable attachment connected to either the slidable wheel assembly or to the vehicle body, thereby permitting the wheel assembly to be slid substantially rearward for trailer loading purposes. The slanted trailer skirt 91 could then be moved to a stowed position of reduced longitudinal length, allowing the wheels to be slid rearward during trailer loading operations.

The rearmost ends of these slanted trailer skirts 91 are also shown disposed higher above the ground than the forwardmost ends thereof, thereby permitting greater air flow from in-between the wheel sets to flow rearward into the zone of reduced pressure located immediately behind the trailer, further reducing drag on the vehicle.

While these slanted trailer skirts 91 are each shown in FIGS. 23-26 with the rearmost ends disposed apart and aligned directly behind the central axle 88, the ends could be instead disposed in proximal adjacency to form an effective tail fin between the combined skirts 91 disposed on both sides of the vehicle. With the rearmost ends disposed in even greater proximity, then increases the need to raise the rearmost portions higher above the ground to facilitate unrestricted air flow there-through from in-between the wheel sets, to thereby reduce drag on the vehicle.

Fifteenth Embodiment—FIGS. 21 and 22

As shown in FIGS. 21 and 22, an embodiment comprises a slanted mud flap 94 disposed directly behind a rearmost wheel 83 and optionally immediately rearward of an upper wheel skirt 92. The mud flap 94 is disposed in a distinctly slanted arrangement, while also extending substantially across the lateral width of the rearward wheel 83, to further streamline the body of the vehicle by decreasing the effective drag coefficient developed on the mud flap itself, being exposed to headwinds.

Conventional mud flaps generally extend only laterally across the body of the vehicle, being generally oriented perpendicular to the direction of motion of the vehicle, thereby maximizing the drag induced thereon. By angling the mud flap to taper laterally inward from the forwardmost side thereof positioned laterally near the outside of the vehicle toward the rearmost side thereof—positioned laterally substantially closer to the centerline of the vehicle—the slanted mud flap 94 then provides a measure of streamlining to the vehicle, increasing vehicle propulsive efficiency.

The slanted mud flap 94 is preferably slanted at a shallow angle relative to the direction of motion of the vehicle in order to maximize streamlining and drag reduction on the vehicle. However, substantially steeper angles may also be employed where insufficient space exists between the rearmost wheels 83 and the rear end of the trailer.

And the slanted mud flap be further disposed hanging from a hinged support, where the mud flap angle is pivotally adjustable, providing for adjustment of the angular arrangement of the mud flap where variable space exists between the wheels and the rear of the trailer. Such a pivoted arrangement may include a spring-loaded hinge where the mud flap orientation may collapse from a shallow angled slanted position, to a conventional perpendicular orientation, whenever the rearmost wheels 83 are adjusted close to the rear end of the trailer.

It may also be appreciated that additional streamlining may be achieved by shaping the mud flap 96 front-to-back in a curved manner similar to that as in one side of a tail fin or wing, thereby further reducing the effective drag coefficient thereon. For example, an improved aerodynamic arrangement may include shaping a portion of the mud flap 96 in the general form of a cubic parabola (as referenced above), as shown in FIG. 21. Such a complex curved shape can provide additional streamlining over the simple slanted mud flap 94, by further reducing drag on both surfaces positioned either to the inside or to the outside of the mud flap 96.

And it may be even further appreciated that the slanted mud may also be used in conjunction with one of the aforementioned wheel shielding embodiments—such as a wheel deflector panel 45 or an upper wheel skirt 92—to further reduce drag on the vehicle.

Sixteenth Embodiment—FIGS. 27-30

Figure 27:
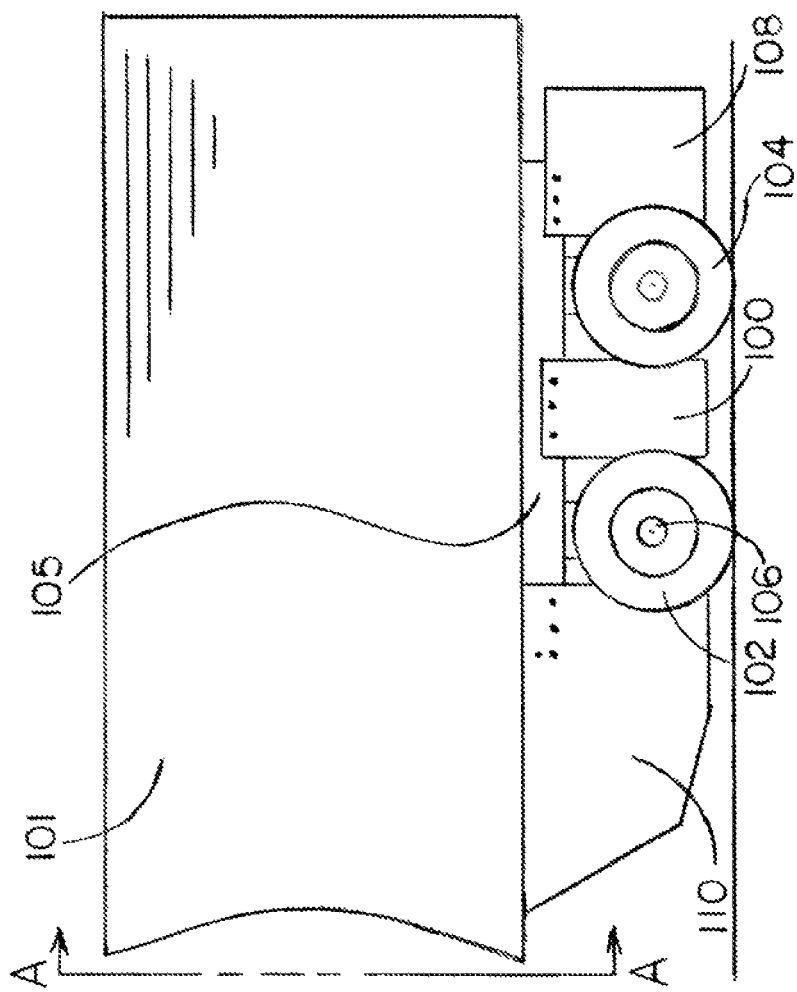
In FIG. 27, a medial inner skirt panel 100 is shown in side view largely spanning the space in-between the forward and rearward wheels of a tandem wheel assembly 105 on a semitrailer 101, while being further disposed laterally proximate to the lateral position of the innermost sidewalls of the wheel assembly. A rear inner skirt panel 108 is also similarly shown disposed inline with the medial inner skirt panel, while instead extending rearward of the rearmost wheel of the tandem wheel assembly. And a forward inner skirt panel 110 is also similarly shown disposed inline with medial inner skirt panel, while instead extending ahead of the forwardmost wheel of the tandem wheel assembly. All panels are disposed at a laterally interior location near an innermost sidewall of the wheel assembly.
Figure 28:
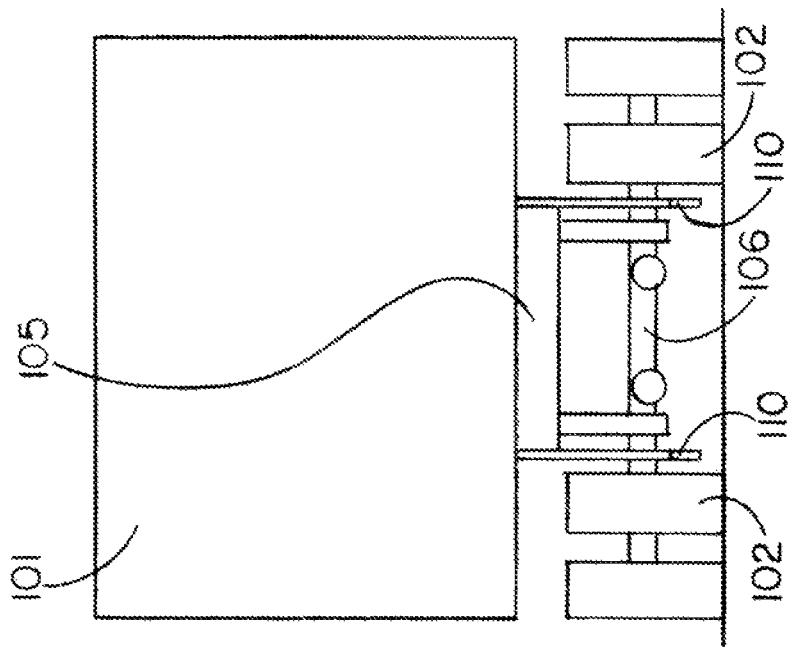
In FIG. 28, the inner skirt panels of FIG. 27 are shown on the semitrailer in front view disposed inline underneath the body of the semitrailer. The front view is shown as the cross sectional view A-A of FIG. 27.
Figure 29:
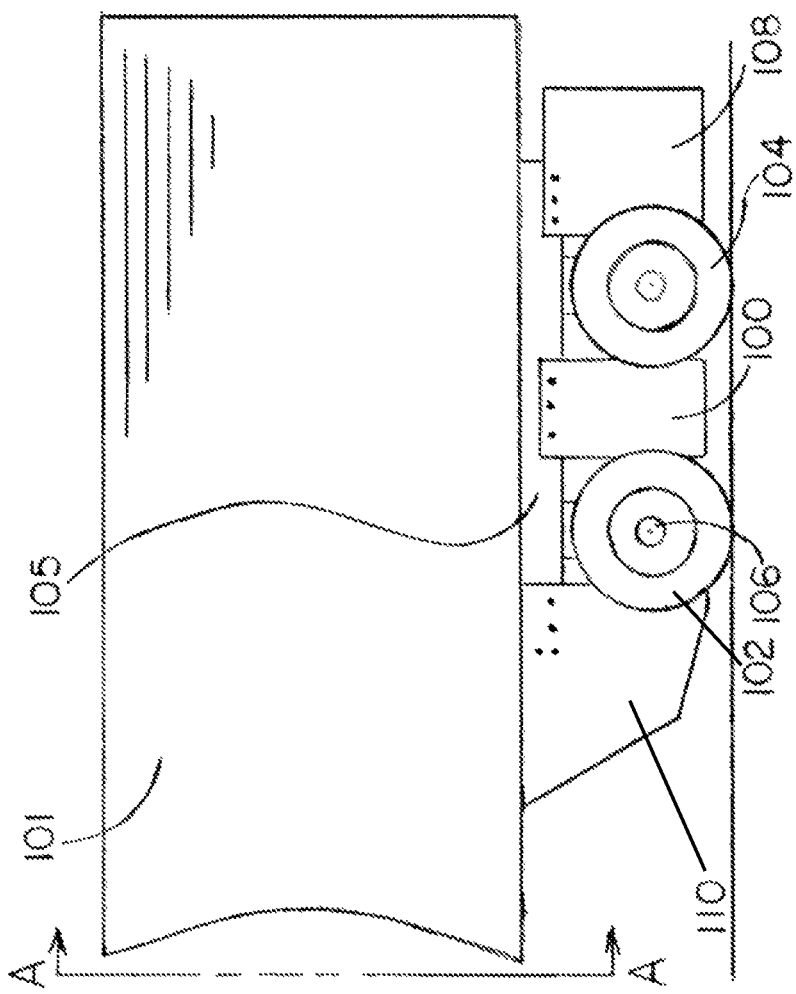
Figure 30:
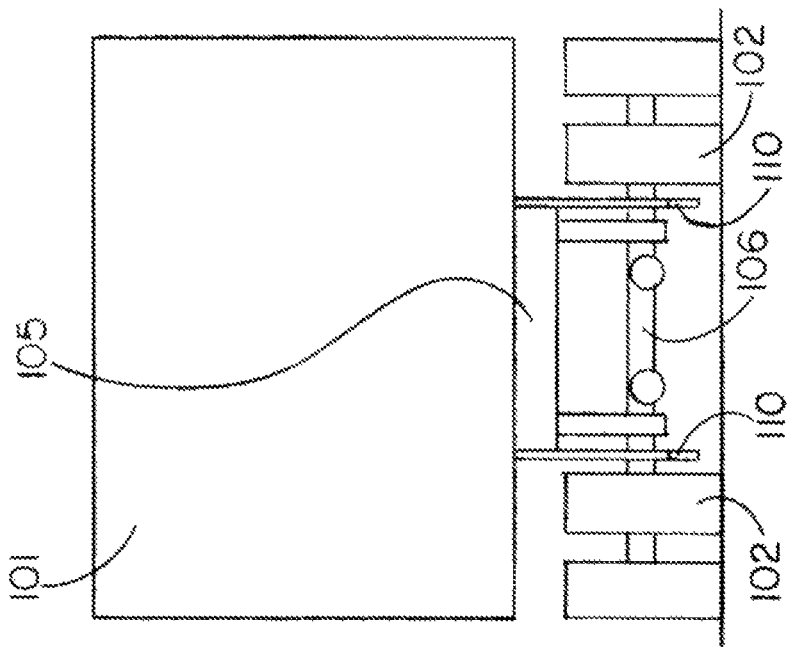
In FIG. 30, the inner skirt panels of FIG. 29 are shown on the semitrailer in front view disposed inline underneath the body of the semitrailer. The front view is shown as the cross sectional view A-A of FIG. 29.

As shown in FIGS. 27 and 28, an embodiment comprises a medial inner skirt panel 100 disposed substantially in-between the forward wheel 102 and rearward wheel 104 of a tandem wheel assembly 105 on a semitrailer 101. The medial inner skirt panel 100 is attached to the frame of the tandem wheel assembly 105, and is further disposed to be laterally aligned near to the lateral position of the laterally innermost sidewall of the innermost wheel of the tandem wheel assembly. The medial inner skirt panel 100 preferably extends from near the top of tandem assembly downwards to generally below the axle 106.

The medial inner skirt panel 100 provides a barrier between the otherwise intervening wheel open-space that exists in-between the forward and rearward wheels of the tandem wheel assembly, and the central tandem open-space that exists in-between the opposing innermost wheels of the tandem wheel assembly. So disposed, the medial inner skirt panel 100 inhibits displacement of air molecules from exchanging in-between the intervening wheel open-space and the central tandem open-space between the dual wheels—which is caused by the motion of the passing wheels—thereby reducing drag on the moving vehicle.

As shown in FIGS. 27 and 28, another embodiment comprises a rear inner skirt panel 108 disposed rearward of the rearmost wheel 104 of a wheel assembly on a semitrailer. The rear inner skirt panel 108 is attached to the frame of the tandem wheel assembly, and is further disposed to be laterally aligned near to the lateral position of the laterally innermost sidewall of innermost wheel of the tandem wheel assembly. The rear inner skirt panel 108 preferably extends from near the top of tandem assembly downwards to generally below the axle 106, consistent with ground obstacle clearance requirements.

As shown in FIGS. 27 and 28, another embodiment comprises a forward inner skirt panel 110 disposed ahead of the forwardmost wheel 104 of a wheel assembly on a semitrailer. The forward inner skirt panel 110 is attached to the frame of the tandem wheel assembly, and is further disposed to be laterally aligned near to the lateral position of the laterally innermost sidewall of the innermost wheel of the tandem wheel assembly. The forward inner skirt panel 110 preferably extends from near the top of tandem assembly downwards to generally below the axle 106, consistent with ground obstacle clearance requirements.

And while the inward-facing surface of the rear skirt panels 108 is generally flat for minimal drag thereon from air passing in-between the innermost wheels through the central tandem open-space, the outward-facing surface thereof may be curved in a streamlined shape—for reduced drag from the laterally inward directed movement of air impinging thereon—to provide more laminar motion of air toward the rearmost portion of the panel, further reducing drag on the vehicle. By the further streamlining the outward facing surface for lateral air motion, a more laminar condition of air motion immediately behind the rear skirt panel 108 can be achieved, thereby further reducing drag on the moving vehicle.

And while the inner skirt panels 100, 108 and 110 generally extend below the axle 106, the function of the inner skirt panels is not principally for reducing drag on the relatively low effective vehicle-drag-inducing lower-wheel surfaces, but rather includes further stabilizing the generally static air passing under the central axle 106 and through the central tandem open-space.

Since a static air column possesses maximum pressure therein relative to an adjacent moving air column—since moving air molecules possess a component of momentum force in addition to a pressure force component that then offsets the resistive wholly pressure force component existing within the adjacent static air column—a generally static air column more effectively connected to the rear of the vehicle can thereby transmit maximum air pressure onto the rear of the vehicle.

By further stabilizing any internal relative motion of air molecules within this central air column, then maximizes the volume of static air passing with minimal disturbance under the moving vehicle through the central tandem open-space, with the central air column thereby remaining in a more laminar relative flow condition as a result. With a maximally stabilized streamlined flow condition present within the central air column passing under or through the center of the tandem wheel assembly, any increased air pressure developed ahead of tandem wheel assembly is then more fully communicated through the central tandem open-space to the rear of the vehicle at up to the speed of sound.

Any increased air pressure developed ahead of the tandem wheel assembly then also acts to increase the amount of relative air flowing through the central tandem open-space to the rear of the vehicle. And as taught above, any increase in effective air flowing to the rear of the vehicle then reduces the differential pressure developed between the front and rear of the moving vehicle, to thereby reduce the overall pressure drag being developed thereon.

Furthermore, since a function of the present embodiment is to stabilize the central air column passing under the vehicle, the inner skirt panels 100, 108 and 110 are best positioned laterally inward near to the lateral position of the innermost sidewall of the innermost wheel, rather than closer to the laterally outermost tire sidewall. So positioned, the inner skirt panels largely prevent lateral air displacement within the central air column under the tandem wheel assembly by the moving wheels, thereby protecting the stability of this air column from disturbance by the passing wheels.

If for example, the medial inner skirt panels were instead positioned laterally near the outside of the vehicle, then the medial inner skirt panel 100 would then allow for otherwise largely undisturbed air to be exchanged laterally from in-between the central tandem open-space that exists in-between the opposing innermost wheels of the tandem wheel assembly, and the intervening wheel moving open-space that exists in-between the forward and rearward wheels of the moving tandem wheel assembly, thereby diminishing any vehicle drag-reducing effect from air passing relatively undisturbed through the central open portion of the tandem wheel assembly. With the skirt panels instead positioned near the outside of the vehicle, lateral air displacement from the outside of the vehicle to partially fill the passing void in-between the wheels is instead diminished, thereby enhancing the flow exchange of air instead from within the central air column itself to fill the passing void in-between the wheels, thereby minimizing any vehicle drag reduction from stabilizing air within the central air column passing in-between the wheel sets.

While the skirt panels are shown disposed laterally just inside the inner sidewalls of the wheel assembly, the skirt panels could also be arranged either flush with the inner sidewalls for additional streamlining, or even be disposed further towards the outside of the vehicle. So disposed more towards the outermost wheel of the dual wheel assembly—rather than adjacent to the innermost sidewalls of the innermost wheel—the medial inner skirt panel would then largely span the space in-between the forward are rearward wheels of the tandem wheel assembly.

In a further example, as shown in FIGS. 27 and 28, the forward inner skirt panel 110 shown disposed immediately ahead of the wheels may further enhance the stabilization of the central air column by deflecting any air stream impinging the forwardmost wheel toward the outside of the vehicle, rather than allowing the displaced air from the wheel to disturb the central air column in front of the central axle, as would an outer forward-extending skirt panel positioned near the outside of the wheel assembly as explained above. And while shown arranged parallel to the longitudinal centerline of the vehicle, the forward inner skirt panel 110 could also be arranged at a converging inwardly progressing angle to enhance air flow under the tandem wheel assembly.

If arranged at an inwardly progressing convergent angle, the forward central skirt panel 110 disposed on both lateral sides of the vehicle may then form a partial open funnel to increase the relative air flowing in-between the wheels through the central tandem open-space. However, if arranged at too steep an inwardly progressing angle, the drag induced on the forward central skirt panel may more than offset the gains in vehicle drag reduction from more air flowing in-between the wheels through the central tandem open-space. Hence, a method for determining the proper inwardly progressing angle and overall dimension of the forward central skirt panel 110 to be used for any given vehicle operating condition arises as a compromise between these two opposing design considerations.

And as shown in FIGS. 27 and 28, in another embodiment the rear inner skirt panel 108 disposed immediately behind the wheels may further enhance air flow through the central tandem open-space by arranging the trailing panels at an outwardly progressing angle. This diverging arrangement of the trailing panels may then provide for a partial open nozzle flow-accelerating effect from the expanding air exiting therefrom, thereby helping to further increase air flow through the central tandem open-space. The outwardly progressing angle of the panels is again limited to that which will increase the air flowing through the central tandem open-space without either adding too much additional drag on the panels, or reducing the transmitted air pressure gained at the rear of the vehicle, to offset any gains in overall vehicle drag reduction achieved therefrom. Hence, a method for determining the proper outwardly progressing angle and overall dimension of the rear inner skirt panel 108 to be used for any given vehicle operating condition also arises as a compromise between these two opposing design considerations.

An even further embodiment comprises two or more of the skirt panels connected together to form a single streamlined panel, extending from as far as from immediately ahead of the forwardmost wheel, rearward to as far as immediately behind the rearmost wheel of the tandem wheel assembly. The combined panel is then arranged to accommodate vertical motion of the axle, while largely shielding the central tandem open-space from moving innermost wheel sidewalls and the moving spaces located immediately forward and rearward of the wheels, thereby providing streamlined surfaces along the lateral sides of the central tandem open-space to minimize any lateral disturbance of air within central tandem open-space by the moving wheel surfaces.

Since modern tandem wheel assemblies on semitrailers are often adjustable to slide longitudinally along the body of the trailer, the inner skirt panels are often arranged to remain in a fixed position relative to the slidable tandem wheel assembly itself, rather than being in a fixed longitudinal position attached directly to the underside of the trailer body. Thus, the inner skirt panels can be attached directly to the slidable tandem wheel assembly. So disposed attached to the tandem wheel assembly, the moveable inner skirt panels remain largely effective in stabilizing air within the central air column under the moveable tandem wheel assembly—from induced displacement by the adjacent moving wheels—regardless of the longitudinal location of the tandem wheel assembly along the trailer body.

Advantages

From the description above, a number of advantages of some embodiments become evident:

(a) An improved aerodynamic wheel set deflector panel located in front of trailing wheels and ideally extending downward to no lower than the axle to thereby deflect headwinds onto mechanically disadvantaged lower wheel surfaces and to shield trailing mechanically-advantaged upper wheel surfaces from headwinds, thereby reduces overall vehicle drag improving propulsive efficiency.

(b) An improved aerodynamic wheel assembly deflector panel which may deflect headwinds below the central axle assembly, and where in front of trailing wheels ideally extending downward to no lower than the axle to thereby deflect headwinds onto mechanically disadvantaged lower wheel surfaces and to shield trailing mechanically-advantaged upper wheel surfaces from headwinds, thereby reduces overall vehicle drag improving propulsive efficiency.

(c) An improved aerodynamic deflector and skirt assembly where in front of trailing wheels ideally extending downward to no lower than the axle to thereby deflect headwinds onto mechanically disadvantaged lower wheel surfaces and to shield trailing mechanically-advantaged upper wheel surfaces from headwinds, thereby reduces overall vehicle drag improving propulsive efficiency.

(d) An improved aerodynamic vehicle skirt panel assembly ideally extending downward to no lower than the axle to thereby deflect headwinds onto mechanically disadvantaged lower wheel surfaces and to shield trailing mechanically-advantaged upper wheel surfaces from headwinds, reduces total weight of the skirt assembly, improves the skirt ground clearance of road obstacles, and reduces overall vehicle drag improving propulsive efficiency.

(e) An improved aerodynamic wheel skirt panel assembly ideally extending downward to no lower than the axle to thereby deflect headwinds onto mechanically disadvantaged lower wheel surfaces and to shield trailing mechanically-advantaged upper wheel surfaces from headwinds reduces overall vehicle drag thereby improving propulsive efficiency.

(f) An improved aerodynamic vehicle skirt panel assembly ideally extending downward to no lower than the axle to thereby deflect headwinds onto mechanically disadvantaged lower wheel surfaces and to shield trailing mechanically-advantaged upper wheel surfaces from headwinds, reduces total weight of the skirt assembly, improves the skirt ground clearance of road obstacles, and reduces overall vehicle drag improving propulsive efficiency.

(g) An aerodynamic slanted trailer skirt disposed on both sides of a semitrailer forms an effective tail fin on the tractor of a tractor-trailer combination, reducing drag thereon. The slanted trailer skirt also induces air to flow laterally inward underneath the semitrailer and in-between the trailing wheel sets thereof, increasing the effective air pressure developed immediately behind the trailer to reduce drag thereon. The slanted trailer skirt thereby improves vehicle propulsive efficiency by reducing drag on both the tractor and the trailer of a semitruck.

(h) An aerodynamic slanted mud flap disposed on a semitrailer further streamlines the vehicle, reducing drag thereon. The slanted mud flap also induces air to flow laterally inward underneath the semitrailer, further increasing the effective air pressure developed immediately behind the trailer to reduce drag thereon. The slanted mud flap thereby improves vehicle propulsive efficiency by reducing drag on the trailer of a semitruck.

(i) An inner skirt panel aligned near the lateral position of the innermost sidewall of the innermost wheel of the tandem wheel assembly inhibits lateral displacement of air molecules from in-between the intervening wheel open-space and the central tandem open-space along the axle between the wheels, thereby stabilizing the central air column passing through the tandem wheel assembly to reduce drag on the moving vehicle. The inner skirt panel thereby helps stabilize the generally static air passing through the central tandem open-space underneath the tandem wheel assembly, further increasing the effective air pressure developed immediately behind the trailer to reduce overall drag on the vehicle. The inner skirt panel thereby improves vehicle propulsive efficiency by reducing the effective overall drag on the trailer of a semitruck.

CONCLUSIONS, RAMIFICATIONS, AND SCOPE

Exposed wheels can generate considerable drag forces on a moving vehicle. These forces are directed principally near the top of the wheel, rather than being more evenly distributed across the entire profile of the wheel. Furthermore, these upper-wheel drag forces are levered against the axle, thereby magnifying the counterforce required to propel the vehicle. As a result, a reduction in drag upon the upper wheel generally enhances propulsive efficiency significantly more than a corresponding drag reduction on other parts of the vehicle.

With the net drag forces being offset and directed near the top of the wheel, nearly equivalent countervailing reaction forces—also opposing vehicle motion—are necessarily transmitted to the wheel at the ground. These reaction forces necessitate augmented down-forces to be applied in higher speed vehicles, in order to maintain static frictional ground contact and, thereby, vehicle traction and directional stability. As wings and other means typically used to augment these down-forces in such vehicles can add significant drag, it becomes evident that substantial effort should be made to reduce the upper wheel drag forces on most high-speed vehicles.

Moreover, since the lower wheel drag forces suffer a mechanical disadvantage over propulsive counterforces, using shielding devices to deflect headwinds from impinging on lower wheel surfaces can increase overall vehicle drag. Given these considerations, it becomes evident that drag-reducing vehicle deflectors and skirts should be ideally limited to lengths that inhibit vehicle headwinds from directly impinging on only the upper wheel surfaces, leaving the lower wheel surfaces exposed.

While the embodiments shown illustrate application generally to the trailers of industrial trucks, the embodiments could be similarly applied other trucks and vehicle types having wheel assemblies exposed to headwinds. And while the embodiments shown include skirt assemblies formed from relatively inexpensive flat panels, somewhat curved panels could also be used. Further examples of alternative embodiments include having deflector panels mounted at various angles, all ideally limited in height to extend downward to no lower than the level of the axle.

Although not shown, in the case where additional space exists in front of the wheel assembly, the wheel deflector panel of the ninth embodiment could instead be mounted in nonparallel to the axle in order to deflect winds not only downward, but also to either side of the trailing wheel assembly.

And although not shown, the wheel skirt panel assembly of the thirteenth embodiment could further include a fender covering the front upper tire surfaces and could also extend over the top of wheel assemblies as well. Furthermore, this embodiment could also be disposed on the rearward wheel assemblies of the trailer as well.

In addition, the embodiments generally can include various methods of resilient mounting to the vehicle body permitting the panels to deflect when impacted by road obstructions and return undamaged to their normal aerodynamic position.

And as shown, a slanted trailer skirt disposed under a semitrailer induces air to flow laterally inward to thereby streamline the lower portion of the tractor for reduced drag thereon, while also increasing the air pressure developed immediately behind the trailer to further reduce drag on the vehicle itself. While shown for general use on a semitrailer, this inwardly disposed slanted trailer skirt configuration could also be utilized on smaller vehicles, such as medium-sized trucks having substantial open space existing immediately in-between the forward cab and the rearward wheel assembly.

And as shown, the slanted mud flap assembly disposed under a semitrailer induces air to flow laterally inward to thereby streamline the trailer for reduced drag thereon, while also further increasing air pressure developed immediately behind the trailer to further reduce drag on the vehicle itself. And while shown for general use on a semitrailer, this inwardly disposed slanted mud flap assembly could also be utilized on smaller vehicles, such as medium-sized trucks having substantial open space existing immediately behind the rearward wheel assembly.

And as shown, the inner skirt panel disposed toward the inside of a tandem wheel assembly on a semitrailer further streamlines the vehicle, reducing drag thereon. The inner skirt panel thereby improves vehicle propulsive efficiency by reducing drag on the trailer of a semitruck. And while shown for general use on a semitrailer, the inner skirt panel could also be used on the rearward wheels of the tractor of a semitruck. Moreover, the inner skirt panel could also be used on smaller vehicles, such as medium-sized trucks having a single rear wheel assembly. And the inner skirt panel could even be utilized on automobiles, extending either in front or rearward of the wheel, ensuring that air displaced by the wheel is directed to the outside of the wheel, rather than laterally inward underneath the vehicle to disturb the central air column. Thus, the inner skirt panel could prove particularly beneficial when used on high speed racecars, requiring enhanced aerodynamic performance.

Accordingly, the embodiments should not be limited to the specific examples illustrated and described above, but rather to the appended claims and their legal equivalents.

I claim:

1. An apparatus reducing drag on a terrestrial vehicle in forward motion, said apparatus comprising:
    an inner wheel skirt assembly that comprises at least one vertical panel aligned parallel and disposed proximate to a laterally innermost sidewall of a laterally innermost wheel of a wheel assembly, said wheel assembly being disposed wholly on one lateral side of the vehicle;
    the vertical panel having a lowermost panel edge positioned no higher than a minimum panel downward level located at an elevation above the bottom of the wheel assembly equal to one-third the diameter of said wheel assembly;
    the vertical panel disposed wholly no further laterally from said innermost sidewall than a distance equal to two-thirds of the lateral width of the wheel assembly; and
    the inner wheel skirt assembly configured wherein any flat panels thereof are each disposed in a substantially non-horizontal orientation.

2. The apparatus of claim 1, wherein, further:
    the minimum panel downward level is positioned no higher than the higher of either the bottom of a wheel rim of the wheel assembly or an elevation above the bottom of the wheel assembly equal to 25 percent of the diameter of said wheel assembly;
    the vertical panel is flat;
    the lowermost panel edge intersects a non-horizontal rearmost panel edge at a lowermost rear panel edge junction that is located forward of the center of an axle of the wheel assembly, said lowermost rear panel edge junction being further located at an elevation below a midmost level of the axle and horizontally no further forward from the center of the axle than half of the diameter of the wheel assembly;
    the lowermost panel edge extends forward on the vehicle from the lowermost rear panel edge junction;
    the vertical panel is disposed wholly no further laterally from said innermost sidewall than a distance equal to one-third the lateral width of the wheel assembly; and
    the inner wheel skirt assembly is disposed wholly no further laterally from said innermost sidewall than a distance equal to two-thirds of the lateral width of the wheel assembly.

3. The apparatus of claim 2, wherein, further:
the lowermost panel edge is located no higher than an elevation above the bottom of the wheel assembly equal to 20 percent of the diameter of said wheel assembly.

4. The apparatus of claim 3, wherein, further:
the vertical panel is disposed laterally inside said innermost sidewall; and
the inner wheel skirt assembly extends no further forward of the wheel assembly than a distance equal to 125 percent of the diameter of said wheel assembly.

5. The apparatus of claim 3, wherein, further:
the vehicle is a tractor of a semitruck.

6. The apparatus of claim 2, wherein, further:
the vehicle has a rearward component of a vehicle body, said rearward body component being supported thereunder by the wheel assembly, with the wheel assembly exposed to headwinds impinging upon a forward-facing lowermost portion of the wheel assembly when the vehicle is in forward motion, and with said forward-facing lowermost portion consisting of forward-facing wheel surfaces spanning between the bottom of the wheel assembly and the midmost level of the axle;
the rearward body component comprises a first substantially rectangular vertical wall arranged along a first outermost lateral side of the vehicle;
the height of the first wall is not less than 70 percent of the lateral width of the rearward body component;
the length of the first wall is not less than the height of the first wall;
the rearward body component comprises a second vertical wall that is substantially equal in size to the first wall, with said second wall respectively disposed parallel thereto along an opposite outermost lateral side of the vehicle from the first side;
the rearward body component comprises a horizontal top panel spanning between the upper edges of said first and second vertical walls along the respective lengths thereof;
the rearward body component comprises a continuously flat rectangular floor spanning between the first and second vertical walls along the respective lengths thereof; and
the flat rectangular floor is disposed wholly above the top of the wheel assembly.

7. The apparatus of claim 6, wherein, further:
the vertical panel extends downward to a level positioned no higher than an elevation above the bottom of the wheel assembly equal to 20 percent of the diameter of said wheel assembly; and
the rearward body component is attached to the vehicle in a permanent manner.

8. The apparatus of claim 7, wherein, further:
the vertical panel is disposed laterally inside said innermost sidewall; and
the inner wheel skirt assembly extends no further forward of the wheel assembly than a distance equal to 125 percent of the diameter of said wheel assembly.

9. The apparatus of claim 7, wherein, further:
the wheel assembly is aligned inline directly behind a proximate rearward wheel of the vehicle.

10. The apparatus of claim 7, wherein, further:
the vehicle comprises a semitrailer; and
the semitrailer comprises the wheel assembly.

11. The apparatus of claim 10, wherein, further:
the wheel assembly is a forwardmost wheel of the semitrailer.

12. The apparatus of claim 11, wherein, further:
the vertical panel is disposed laterally inside said innermost sidewall; and
the inner wheel skirt assembly extends no further forward of the wheel assembly than a distance equal to 125 percent of the diameter of said wheel assembly.

13. A method for reducing drag on a terrestrial vehicle in forward motion, said method comprising:
forming an inner wheel skirt assembly that comprises:
at least one vertical panel aligned substantially parallel and disposed proximate to a laterally innermost sidewall of a laterally innermost wheel of a wheel assembly, said wheel assembly being disposed wholly on one lateral side of the vehicle;
the vertical panel having a lowermost panel edge positioned no higher than a minimum panel downward level located at an elevation above the bottom of the wheel assembly equal to one-third the diameter of said wheel assembly;
the vertical panel disposed wholly no further laterally from said innermost sidewall than a distance equal two-thirds of the lateral width of the wheel assembly; and
the inner wheel skirt assembly configured wherein any flat panels thereof are each disposed in a substantially non-horizontal orientation;
and
configuring the inner skirt assembly to inhibit a substantial amount of air displaced by the forward moving wheel assembly from passing laterally inside said innermost sidewall whereby
when the vehicle is operated at 65 mph under null wind conditions any combined further increase in the forward extension of the inner wheel skirt assembly or further decrease in the downward extension of the inner wheel skirt assembly would further increase overall vehicle drag above a standard amount otherwise induced when the inner wheel skirt assembly is otherwise absent from the vehicle.

14. The method of claim 13, wherein, further:
the minimum panel downward level is positioned no higher than the higher of either the bottom of a wheel rim of the wheel assembly or an elevation above the bottom of the wheel assembly equal to 25 percent of the diameter of said wheel assembly;
the vertical panel is flat;
the lowermost panel edge intersects a non-horizontal rearmost panel edge thereof at a lowermost rear panel edge junction that is located forward of the center of an axle of the wheel assembly, said lowermost rear panel edge junction being further located at an elevation below a midmost level of the axle and horizontally no further forward from the center of the axle than half of the diameter of the wheel assembly;
the lowermost panel edge extends forward on the vehicle from the lowermost rear panel edge junction;
the vertical panel is disposed wholly no further laterally from said innermost sidewall than a distance equal to one-third the lateral width of the wheel assembly; and
the inner wheel skirt assembly is disposed wholly no further laterally from said innermost sidewall than a distance equal to two-thirds of the lateral width of the wheel assembly.

15. The method of claim 14, wherein, further:
the lowermost panel edge is located no higher than an elevation above the bottom of the wheel assembly equal to 20 percent of the diameter of said wheel assembly.

16. The method of claim 15, wherein, further:
the vertical panel is disposed laterally inside said innermost sidewall; and
the inner wheel skirt assembly extends no further forward of the wheel assembly than a distance equal to 125 percent of the diameter of said wheel assembly.

17. The method of claim 14, wherein, further:
the vehicle has a rearward component of a vehicle body, said rearward body component being supported thereunder by the wheel assembly, with the wheel assembly exposed to headwinds impinging upon a forward-facing lowermost portion of the wheel assembly when the vehicle is in forward motion, and with said forward-facing lowermost portion consisting of forward-facing wheel surfaces spanning between the bottom of the wheel assembly and the midmost level of the axle;
the rearward body component comprises a first substantially rectangular vertical wall arranged along a first outermost lateral side of the vehicle;
the height of the first wall is not less than 70 percent of the lateral width of the rearward body component;
the length of the first wall is not less than the height of the first wall;
the rearward body component comprises a second vertical wall that is substantially equal in size to the first wall, with said second wall respectively disposed parallel thereto along an opposite outermost lateral side of the vehicle from the first side;
the rearward body component comprises a horizontal top panel spanning between the upper edges of said first and second vertical walls along the respective lengths thereof;
the rearward body component comprises a continuously flat rectangular floor spanning between the first and second vertical walls along the respective lengths thereof; and
the flat rectangular floor is disposed wholly above the top of the wheel assembly.

18. The method of claim 17, wherein, further:
the lowermost panel edge is located no higher than an elevation above the bottom of the wheel assembly equal to 20 percent of the diameter of said wheel assembly; and
the rearward body component is attached to the vehicle in a permanent manner.

19. The method of claim 18, wherein, further:
the vertical panel is disposed laterally inside said innermost sidewall; and
the inner wheel skirt assembly extends no further forward of the wheel assembly than a distance equal to 125 percent of the diameter of said wheel assembly.

20. The method of claim 18, wherein, further:
the wheel assembly is aligned inline directly behind a proximate rearward wheel of the vehicle.

21. The method of claim 18, wherein, further:
the vehicle comprises a semitrailer; and
the semitrailer comprises the wheel assembly.

22. The method of claim 21, wherein, further:
the wheel assembly is a forwardmost wheel of the semitrailer.

23. The method of claim 22, wherein, further:
the vertical panel is disposed laterally inside said innermost sidewall; and
the inner wheel skirt assembly extends no further forward of the wheel assembly than a distance equal to 125 percent of the diameter of said wheel assembly.

24. The method of claim 14, wherein, further:
the vehicle is a tractor of a semitruck.

* * * * *